United States Patent
Feng

(10) Patent No.: US 11,463,931 B2
(45) Date of Patent: *Oct. 4, 2022

(54) DATA TRANSMISSION METHOD, BASE STATION, AND TERMINAL EQUIPMENT

(71) Applicant: GUANGDONG OPPO MOBILE TELECOMMUNICATIONS CORP., LTD., Guangdong (CN)

(72) Inventor: Bin Feng, Guangdong (CN)

(73) Assignee: GUANGDONG OPPO MOBILE TELECOMMUMCATIONS CORPS., LTD., Guangdong (CN)

( * ) Notice: Subject to any disclaimer, the term of this patent is extended or adjusted under 35 U.S.C. 154(b) by 9 days.

This patent is subject to a terminal disclaimer.

(21) Appl. No.: 17/037,278

(22) Filed: Sep. 29, 2020

(65) Prior Publication Data
US 2021/0084555 A1    Mar. 18, 2021

Related U.S. Application Data

(63) Continuation of application No. 16/071,036, filed on Jul. 18, 2018, now Pat. No. 10,849,037.

(51) Int. Cl.
*H04W 36/16* (2009.01)
*H04W 88/04* (2009.01)
(Continued)

(52) U.S. Cl.
CPC ........... *H04W 36/165* (2013.01); *H04W 4/70* (2018.02); *H04W 8/005* (2013.01); *H04W 36/38* (2013.01);
(Continued)

(58) Field of Classification Search
None
See application file for complete search history.

(56) References Cited

U.S. PATENT DOCUMENTS 10,849,037 B2 * 11/2020 Feng ..................... H04W 8/005
2009/0003261 A1    1/2009 Kim
(Continued)

FOREIGN PATENT DOCUMENTS

| CN | 101521902 A | 9/2009 |
|---|---|---|
| CN | 101841865 A | 9/2010 |

(Continued)

OTHER PUBLICATIONS

Rejection Decision of the Chinese application No. 201680080725.3, dated Jun. 4, 2021.
(Continued)

*Primary Examiner* — Lonnie V Sweet
(74) *Attorney, Agent, or Firm* — Ladas & Parry LLP

(57) ABSTRACT

The embodiments of the invention disclose a data transmission method comprising: a base station receives terminal information transmitted by terminal equipment; the base station determines, according to the terminal information, that the terminal equipment is able to communicate with the base station via a first relay node; and the base station transmits to the terminal equipment a first notification message to, instruct the terminal equipment to communicate with the base station via the first relay node. In the embodiment of the invention, the base station can instruct the terminal equipment to switch from a cellular link to a sidelink passing through the first relay node, thereby ensuring communication quality between the terminal equipment and the base station.

15 Claims, 6 Drawing Sheets

(51) Int. Cl.
 H04W 76/14 (2018.01)
 H04W 76/23 (2018.01)
 H04W 4/70 (2018.01)
 H04W 8/00 (2009.01)
 H04W 36/38 (2009.01)
 H04W 92/10 (2009.01)
 H04W 92/18 (2009.01)
(52) U.S. Cl.
 CPC ........... *H04W 76/14* (2018.02); *H04W 76/23* (2018.02); *H04W 88/04* (2013.01); *H04W 92/10* (2013.01); *H04W 92/18* (2013.01)

(56) References Cited

U.S. PATENT DOCUMENTS

| | | | |
|---|---|---|---|
| 2009/0227258 A1* | 9/2009 | Youn | H04B 7/2606 455/445 |
| 2010/0304667 A1 | 12/2010 | Chen | |
| 2011/0111693 A1 | 5/2011 | Nakao | |
| 2011/0159802 A1* | 6/2011 | Binti Harum | H04B 7/15528 455/7 |
| 2012/0008546 A1 | 1/2012 | Yokoyama | |
| 2012/0250545 A1* | 10/2012 | Papadogiannis | H04W 40/12 370/252 |
| 2012/0322492 A1 | 12/2012 | Koo | |
| 2013/0016649 A1* | 1/2013 | Damnjanovic | H04W 88/04 370/315 |
| 2013/0603650 | 1/2013 | Feng | |
| 2013/0322388 A1 | 12/2013 | Ahn | |
| 2015/0009915 A1 | 1/2015 | Baek et al. | |
| 2015/0237563 A1 | 8/2015 | Maric et al. | |
| 2016/0094493 A1* | 3/2016 | Liu | H04L 51/046 709/206 |
| 2016/0212721 A1* | 7/2016 | Sheng | H04W 76/14 |
| 2017/0141860 A1 | 5/2017 | Furuichi | |
| 2919/0014490 | 1/2019 | Kim et al. | |

FOREIGN PATENT DOCUMENTS

| | | |
|---|---|---|
| CN | 101960787 A | 1/2011 |
| CN | 102469410 A | 5/2012 |
| CN | 102577586 A | 7/2012 |
| CN | 103607750 A | 2/2014 |
| CN | 104837122 A | 8/2015 |
| CN | 104964970 A | 9/2015 |
| CN | 105188099 A | 12/2015 |
| CN | 105228082 A | 1/2016 |
| EP | 1898562 A2 | 3/2008 |
| JP | 2015115753 A | 6/2015 |
| JP | 2016058490 A | 4/2016 |
| JP | 2017175348 A | 9/2017 |
| KR | 20150004018 A | 1/2015 |
| WO | 2010000094 A1 | 1/2010 |
| WO | 2015002447 A1 | 1/2015 |

OTHER PUBLICATIONS

International Search Report in the international application No. PCT/CN2016/077842, dated Dec. 30, 2016.
Written Opinion of the International Search Authority in the international application No. PCT/CN2016/077842, dated Dec. 30, 2016.
Qualcomm Incorporated: "Relay UE Selection and Reselection Mechanisms", 3GPP Draft; R2-153751 Relay Selection Reselection, 3rd Generation Partnership Project (3GPP), Mobile Competence Centre; 650, Route Des Lucioles; F-06921 Sophia-Antipolis Cedex; France vol. RAN WG2, No. Beijing. China; Aug. 24, 2015-Aug. 28, 2015 Aug. 23, 2015 (Aug. 23, 2015), XP05100-4400 * Section 2, Option 4; Proposai 2; p. 1 *.
Ericsson: "Initiation of ProSe UE-to-Network relay", 3GPP Draft; R2-183482—Initiation of Prose UE-to-Network Relay, 3rd Generation Partnership Project (3GPP), Mobile Competence Centre; 650, Route Des Lucioles; F-06921 Sophia-Antipolis Cedex; France, vol. RAN WG2. No. Beijing. P.R. China; Aug. 24, 2015-Aug. 28, 2015 Aug. 23, 2015 (Aug. 23, 2015), XP051004179, Retrieved from the Internet: URL:http://www.3gpp.org/ftpMeetings_3GPP_SYNC/RAN2/Docs/[retrieved on Aug. 23, 2015] *Subclauses 2.1.1, 2.1.2; p. 3 *.
ZTE (Rapporteur): "Report of email discussion [90#25] LTE/ProSe) Relay UE initiation, discovery and selection/re-selection", 3GPP Draft; R2-153764 Report of 90#25 Relay UE, 3rd Generation Partnership Project (3GPP), Mobile Competence Centre; 650. Route Des Lucioles; F-06921 Sophia-Antipolis Cedex; France . vol. RAN WG2, No. Beijing, China; Aug. 24, 2015-Aug. 28, 2015 Aug. 23, 2015 (Aug. 23, 2015), XP051004410. * Subclause 2.1.3; p. 9 * * Subclause 2.3.2; pp. 23-26 *.
Partial Supplementary European Search Report In European application No. 16895896.5, dated Nov. 7, 2018.
Supplementary European Search Report in the European application No. 16896896.5, dated Mar. 7, 2019.
ZTE, Ericsson, Interdigital, Telecom Italia, "Discussion on Remote UE's Relay discovery, selection and reselection" [online], 3GPP TSG-RAN WG2#91 R2-153766, <URL:http://www.3gpp.org/ftp/tsg_ran/WG2_RL2/TSGR2_91/Docs/R2-153766.zip >, issued on Aug. 26, 2015, pp. 1-6.
Coolpad, "Resource Allocation for IC and OOC Scenarios" [online], 3GPP TSG-RAN WG2#92 R2-156399, <URL: http://www.3gpp.org/ftp/tsg_ran/WG2_RL2/TSGR2_92/Docs/R2-156099.zip>, issued on Nov. 20, 2015. pp. 1-4.
Ericsson, "Signalling required for UE-NW relay selection" [online], 3GPP TSG-RAN WG2#90 R2-152462, <URL: http//www.3gpp.org/ftp/tsg_ran/WG2_RL2/TSGR2_90/Docs/R2-152462.zip>, issued on May 29, 2015, pp. 1-17.
ZTE, "Relay selection and reselection" [online], 3GPP TSG-RAN WG2#90 R2-152647, <URL:http//www.3gpp.org/ftp/tsg_ran/WG2_RL2/TSGR2_90/Docs/R2-152547.zip>, issued on May 29, 2015, pp. 1-4.
OPPO, "Discusslon on the Scenario and Scope for FeD2D" [online], 3GPP TSG-RAN WG2#93bis R2-162195, <URL: http://www.3gpp.org/ftp/tsg_ran/WG2_RL2/TSGR2_93bis/Docs/R2-162195.zip>, issued on Apr. 15, 2016, pp. 1-6.
First Office Action of the Japanese application No. 2018-544100, dated Dec. 24, 2019.
First Office Action of the Chinese application No. 201680080725.3, dated Jul. 2, 2020.
Office Action of the Indian application No. 201817035346, dated Jun. 26, 2020.
Ericsson. "Overview of V2X Enhancements for Further RAN2 Work"; 3GPP TSG-RAN WG2 #93 Tdoc R2-161571 St. Juilians, Malta, Feb. 15-19, 2016.
LG Electronics (Rapporteur), "Summary of email discussion on [92#46][LTE/V2X] Capacity Analysis", 3GPP TSG-RAN WG2 #93 R2-161800 St. Julian's, Malta, Feb. 15-19, 2016.
Office Action of the Taiwaness application No. 106110881, dated Sep. 3, 2020.
Non-Final Office Action of ths U.S. Appl. No. 16/071,036, dated Oct. 18, 2019.
Final Office Action of the U.S. Appl. No. 18/071.938, dated Apr. 9, 2020.
Notice of Allowance of the U.S. Appl. No. 18/071,036, dated Jul. 14, 2020.
First Office Action of the European application No. 16895896.5, dated Feb. 10.2021.
Second Office Action of the Chinese application No. 201680080725.3, dated Mar. 3, 2021.

* cited by examiner

DATA TRANSMISSION METHOD, BASE STATION, AND TERMINAL EQUIPMENT

CROSS REFERENCE TO RELATED APPLICATIONS

This application is a continuation of U.S. application Ser. No. 16/071,036 filed on Jul. 18, 2018, which is a national phase under 35 U.S.C. § 371 of PCT International Application No. PCT/CN2016/077842, filed on Mar. 30, 2016. The contents of these applications are hereby incorporated by reference in their entirety.

BACKGROUND

Conventional mobile communication usually adopts a cellular network-based communication manner. Specifically, in a cellular network when a source terminal is required to transmit data to a target terminal, the source terminal is required to establish a connection with a base station at first, and then data of the source terminal is sent to the target terminal through the base station.

Long Term Evolution (LTE) Release 12 (R12) introduces a Device to Device (D2D) communication technology, also called as a D2D technology. In the D2D communication technology, a terminal may directly communicate with another terminal by virtue of resources allocated by a base station.

The whole D2D process may substantially be divided into a D2D discovery process and a D2D communication process. In the D2D discovery process, a D2D terminal may detect a discovery signal broadcast by another D2D terminal, thereby detecting existence of the other D2D terminal in a short-distance range and recognizing identity information of the other D2D terminal. In the D2D communication process, the D2D terminals may perform data exchange in various forms such as voice communication, multimedia information sharing or the like at a short distance.

LTE Release 13 (R13) introduces a D2D-based terminal relay technology, i.e., a D2D cooperative relaying communication technology. By virtue of the D2D cooperative relaying communication technology, when a terminal is located in an environment without network coverage or network coverage for the terminal is weaker, the terminal may access a base station (or access a network) by taking another terminal located an the network coverage as an access board. The terminal as the access board may be called as a relay terminal or a relay node. That is, a sending terminal may perform data exchange with a base station through a relay terminal an the basis of a SideLink (SL) between the sending terminal and the relay terminal and a Uu interface (including Downlink (DL) and Uplink (UL)) between the relay terminal and the base station.

In a related art, a terminal performs SL and Uu selection on the basis of quality of a signal. A base station may broadcast a threshold value for evaluation of signal quality, and when a signal of a Uu interface between the terminal and the base station is lower than the threshold value, the terminal may select and require to establish a connection with a relay node; and when the signal of the Uu interface is higher than the threshold value, the terminal may stop using the relay node for connection establishment.

In a future wireless communication system, besides conventional terminals, there may appear more and more other types of terminals, for example, a smart bracelet, a wireless television, smart glasses, a robot, a watch and other wearable devices, and the special types of the terminals are lower in cost and may support different bandwidths and transmitted power. In addition, in a D2D cooperative relaying communication technology, different relay terminals may be in different states. For example, a relay terminal of which power or load reaches a certain threshold value may not provide access service for a new terminal.

However, in the related art, a decision about link selection and reselection in a D2D technology is made completely on the basis of a terminal, and a network side may only perform partial control by broadcasting a threshold value of signal quality and allocating resources and may not implement adjustment according to a practical condition of the terminal. Such a communication manner is not flexible enough.

SUMMARY

Embodiments of the disclosure relate to the field of wireless communications, and more particularly to a data transmission method, a base station and terminal equipment.

The embodiments of the disclosure provide a data transmission method, which is capable of performing link switching for communication between terminal equipment and a base station. Such a communication manner may be flexibly implemented.

A first aspect provides a data transmission method, which may include the following operations.

A base station receives terminal information sent by terminal equipment.

The base station determines that the terminal equipment performs communication with the base station through a first relay node according to the terminal information.

The base station sends a first notification message to the terminal equipment, wherein the first notification message is configured to instruct the terminal equipment to perform communication with the base station through the first relay node.

In the embodiment of the disclosure, the base station may instruct the terminal equipment to switch a cellular link to an SL passing through the first relay node, thereby ensuring communication quality between the terminal equipment and the base station.

Optionally, before the operation that the base station determines that the terminal equipment performs communication with the base station through the first relay node according to the terminal information the method may further include the following operations.

The base station receives relay information sent by the first relay node.

The operation that the base station determines that the terminal equipment performs communication with the base station through the first relay node according to the terminal information may include the following operation.

The base station determines that the terminal equipment performs communication with the base station through the first relay node according to the terminal information and the relay information.

In the example, the relay information may include at least one of power information, load information or state information of the first relay node.

In combination with the first aspect, in a first possible implementation mode of the first aspect, the operation that the base station determines that the terminal equipment performs communication with the base station through the first relay node according to the terminal information may include the following operations.

The base station sends a first request message to the first relay node, wherein the first request message may be configured to request the first relay node to serve as a relay between the terminal equipment and the base station.

The base station receives a first feedback message from the first relay node, wherein the first feedback message may be configured to indicate that the first relay node agrees to serve as the relay.

It can be understood that, before the operation that the base station receives the terminal information sent by the terminal equipment, the method may further include that: the base station sends a decision criterion to the first relay node to enable the first relay node to determine whether to serve as the relay according to the decision criterion, wherein the decision criterion may include at least one of a preset power threshold value or a preset load threshold value.

In combination with the first aspect, in a second possible implementation mode of the first aspect, the operation that the base station determines that the terminal equipment performs communication with the base station through the first relay node according to the terminal information may include the following operations.

The base station sends a second request message to a second relay node, wherein the second request message may be configured to request the second relay node to serve as the relay between the terminal equipment and the base station.

The base station receives a second feedback message from the second relay node, wherein the second feedback message may be configured to indicate that the second relay node refuses to serve as the relay.

The base station sends a third request message to the first relay node, wherein the third request message may be configured to request the first relay node to serve as the relay between the terminal equipment and the base station.

The base station receives a third feedback message from the first relay node, wherein the third feedback message may be configured to indicate that the first relay node agrees to serve as the relay.

In combination with the first aspect or any possible implementation mode of the first aspect, in a third possible implementation mode of the first aspect, the method may further include that: the base station sends a second notification message to the first relay node, wherein the second notification message may be configured to indicate the terminal equipment will perform communication with the base station through the first relay node.

In combination with the first aspect or any possible implementation mode of the first aspect, in a fourth possible implementation mode of the first aspect, the method may further include that: the base station sends relay resource configuration information to the first relay node to enable the first relay node to assist the communication between the terminal equipment and the base station by virtue of relay resources.

In combination with the first aspect or any possible implementation mode of the first aspect, in a fifth possible implementation mode of the first aspect, the method may further include that: the base station sends radio resource configuration information to the terminal equipment to enable the terminal equipment to perform the communication by virtue of radio resources.

As an example, before the operation that the base station receives the terminal information sent by the terminal equipment, the method may further include that: the base station sends configuration information to the terminal equipment, wherein the configuration information may be configured to instruct the terminal equipment to perform signal quality measurement.

Optionally, in the embodiment of the disclosure, the terminal information may include at least one of: relay request information; signal quality information between the terminal equipment and the first relay node; signal quality information between the terminal equipment and the base station; or a service priority or link tendency of the terminal equipment.

A second aspect provides a data transmission method, which may include the following operations.

Terminal equipment sends terminal information to a base station.

The terminal equipment receives a first notification message sent by the base station, wherein the first notification message may be configured to instruct the terminal equipment to perform communication with the base station through a first relay node, and the first notification message may be determined by the base station according to the terminal information.

In the embodiment of the disclosure, the terminal equipment receives a notification from the base station and accordingly switches a cellular link to an SL passing through the first relay node, so that communication quality between the terminal equipment and the base station may be ensured.

In combination with the second aspect, in a first possible implementation mode of the second aspect, the method may farther include that: the terminal equipment receives radio resource configuration information sent by the base station; and the terminal equipment performs communication with the base station by virtue of radio resources through the first relay node.

In combination with the second aspect, in a second possible implementation mode of the second aspect, the method may farther include that: the terminal equipment performs communication with the base station by virtue of pre-allocated radio resources through the first relay node.

Optionally, before the operation that the terminal equipment sends the terminal information to the base station, the method may further include that: the terminal equipment receives configuration information sent by the base station; and the terminal equipment performs signal quality measurement according to the configuration information.

A third aspect provides a data transmission method, which may include the following operations.

A first relay node receives a first request message sent by a base station, wherein the first request message is configured to request the first relay node to serve as a relay between terminal equipment and the base station.

When the first relay node agrees to serve as the relay, the first relay node sends a first feedback message to the base station, wherein the first feedback message is configured to indicate that the first relay node agrees to serve as the relay.

Alternatively, when the first relay node refuses to serve as the relay, the first relay node sends a second feedback message to the base station, wherein the second feedback message may be configured to indicate that the first relay node refuses to serve as the relay.

In the embodiment of the disclosure, the base station performs coordinated interaction with the first relay node, and the first relay node may assist the base station to switch a cellular link of the terminal equipment to an SL passing through the first relay node. Or, the first relay node may refuse the request, and the base station switches the cellular link of the terminal equipment to another SL not passing through the first relay node. Therefore, communication quality between the terminal equipment and the base station may be ensured.

Optionally, after the operation that the first relay node receives the first request message sent by the base station, the method may further include that: the first relay node determines whether to agree to serve as the relay according to a decision criterion.

Correspondingly, it can be understood that the method may further include that: the first relay node receives configuration information sent by the base station, the configuration information including the decision criterion, wherein the decision criterion may include at least one of a preset power threshold value or a preset load threshold value.

In a possible implementation mode, the operation that the first relay node determines whether to agree to serve as the relay according to the decision criterion may include that: the first relay node determines whether to agree to serve as the relay according to the decision criterion and relay information of the first relay node, wherein the relay information may include at least one of power information, load information or state information of the first relay node.

In combination with the second aspect, in another possible implementation mode, after the operation that the first relay node sends the first feedback message to the base station, the method may further include that: the first relay node receives a second notification message sent by the base station, wherein the second notification message may be configured to indicate that the terminal equipment will perform communication with the base station through the first relay node.

In combination with the second aspect, in another possible implementation mode, after the operation that the first relay node sends the first feedback message to the base station, the method may further include that: the first relay node receives relay resource configuration information sent by the base station; and the first relay node assists the communication between the terminal equipment and the base station by virtue of relay resources.

A fourth aspect provides a data transmission method, which may include the following operations.

Terminal equipment receives a first notification message sent by a first relay node, wherein the first notification message is configured to instruct the terminal equipment to perform communication with a base station through a first link.

The terminal equipment performs communication with the base station through the first link according to the first notification message.

In the embodiment, the terminal equipment may switch an SL passing through the first relay node to the first link according to a notification of the first relay node, thereby ensuring communication quality between the terminal equipment and the base station.

It can be understood that, before the terminal equipment receives the first notification message sent by the first relay node, the terminal equipment may perform communication with the base station through the first relay node.

In combination with the fourth aspect, in a first possible implementation mode, the first link may be a cellular link between the terminal equipment and the base station, and the first notification message may be configured to instruct the terminal equipment to perform communication with the base station through the cellular link.

Optionally, the operation that communication is performed with the base station through the first link may include that: the terminal equipment receives an access resource sent by the first relay node, wherein the access resource may be requested to the base station by the first relay node; the terminal equipment accesses the base station according to the access resource; and after access, communication is performed with the base station through the cellular link.

In combination with the fourth aspect, in a second possible implementation mode, the first link may be an SL between the terminal equipment and a second relay node, and the first notification message may be configured to instruct the terminal equipment to perform communication with the base station through the SL.

In combination with the fourth aspect, in a third possible implementation mode, the first notification message may be configured to instruct the terminal equipment to select one of multiple links as the first link and perform communication with the base station through the first link, wherein the multiple links may include the SL between the terminal equipment and the second relay node and the cellular link between the terminal equipment and the base station.

Optionally, the operation that communication is performed with the base station through the first link may include the following operation.

The terminal equipment determines that the first link is the cellular link between the terminal equipment and the base station according to signal strength between the terminal equipment and the base station, and performs communication with the base station through the first link.

Optionally, the operation that communication is performed with the base station through the first link may include the following operation.

The terminal equipment determines that the first is the SL between the terminal equipment and the second relay node according to signal strength between the terminal equipment and the second relay node, and performs communication with the base station through the first link.

In an example, the operation that communication is performed with the base station through the first link may include that: the terminal equipment determines that the first link is the SL between the terminal equipment and the second relay node according to the signal strength between the terminal equipment and the second relay node and relay information of the second relay node, and performs communication with the base station through the first link, wherein the relay information may include at least one of power information, load information or state information of the second relay node.

A fifth aspect provides a data transmission method, which may include the following operations.

A first relay node determines to stop serving as a relay between terminal equipment and a base station.

The first relay node sends a First notification message to the terminal equipment, wherein the first notification message is configured to instruct the terminal equipment to perform communication with the base station through a first link.

In the embodiment of the disclosure, the relay node may determine path switching between the terminal equipment and the base station and switch an SL passing through the relay node to the first link. In such a manner, communication quality between the terminal equipment and the base station may be ensured.

Optionally, the operation that the first relay node determines to stop serving as the relay between the terminal equipment and the base station may include that: the first relay node determines, to stop serving as the relay between the terminal equipment and the base station according to relay information, wherein the relay information may include at least one of power information, load information or state information of the first relay node.

In combination with the fifth aspect, in a first possible implementation mode of the fifth aspect, the first link may be a cellular link between the terminal equipment and the base station.

Optionally, the method may further include that the first relay node sends a request message to the base station, wherein the request message may be configured for enabling the first relay node to replace the terminal equipment to request the base station for an access resource; the first relay node receives the access resource sent by the base station; and the first relay node sends the access resource to the terminal equipment to enable the terminal equipment to access the base station according to the access resource.

In combination with the fifth aspect, in a second possible implementation mode of the fifth aspect, the first link may be an SL between the terminal equipment and a second relay node.

In combination with the fifth aspect, in a third possible implementation mode, the first notification message may be configured to instruct: the terminal equipment to select one of multiple links as the first link and perform communication with the base station through the first link, wherein the multiple links may include the SL between the terminal equipment and the second relay node and the cellular link between the terminal equipment and the base station.

A sixth aspect provides a base station, which includes a receiving unit, a sending unit and a determination unit. The base station may be configured to implement the data transmission method in the first aspect or any implementation mode of the first aspect.

A seventh aspect provides terminal equipment, which includes a sending unit, a receiving unit and a communication unit. The terminal equipment may be configured to implement the data transmission method in the second aspect or any implementation mode of the second aspect. Or, the terminal equipment may be configured to implement the data transmission method in the fourth aspect or any implementation mode of the fourth aspect.

An eighth aspect provides a relay node, which refers to terminal equipment for realizing a relay function. The relay node includes a receiving unit, a sending unit and a determination unit, and the relay node may be configured to implement the data transmission method in the third aspect or any implementation mode of the third aspect. Or, the relay node includes a receiving unit, a sending unit and a determination unit, and the relay node may be configured to implement the data transmission method in the fifth aspect or any implementation mode of the fifth aspect.

A ninth aspect provides a base station, which includes a receiver, a transmitter and a processor. The base station may be configured to implement the data transmission method in the first aspect or any implementation mode of the first aspect.

A tenth aspect provides terminal equipment, which includes a transmitter, a receiver and a processor. The terminal equipment may be configured to implement the data transmission method in the second aspect or any implementation mode of the second aspect. Or, the terminal equipment may be configured to implement the data transmission method in the fourth aspect or any implementation mode of the fourth aspect.

An eleventh aspect provides a relay node, which refers to terminal equipment for realizing a relay function. The relay node includes a receiver, a transmitter and a processor, and the relay node may be configured to implement the data transmission method in the third aspect or any implementation mode of the third aspect. Or, the relay node may be configured to implement the data transmission method in the fifth aspect or any implementation mode of the fifth aspect.

A twelfth aspect provides a computer-readable storage medium, which stores a program, and the program enables a base station to execute any data transmission method in the first aspect and various implementation modes thereof.

A thirteenth aspect provides a computer-readable storage medium, which stores a program, and the program enables terminal equipment to execute any data transmission method in the second aspect and various implementation modes thereof; or, the program enables the terminal equipment to execute any data transmission method in the fourth aspect and various implementation modes thereof.

A fourteenth aspect provides a computer-readable storage medium, which stores a program, and the program enables a relay node to execute any data transmission method in the third aspect and various implementation modes thereof; or, the program enables the relay node to execute any data transmission method in the fifth aspect and various implementation modes thereof.

BRIEF DESCRIPTION OF DRAWINGS

In order to describe the technical solutions of the embodiments of the disclosure more clearly, the drawings required to be used in the embodiments or the conventional art will be simply introduced below. Obviously, the drawings described below are only some embodiments of the disclosure. Other drawings may further be obtained by those of ordinary skilled in the art according to these drawings without creative work.

DETAILED DESCRIPTION

The technical solutions in the embodiments of the disclosure will be clearly and completely described below in combination with the drawings in the embodiments of the disclosure. Obviously, the described embodiments are not all embodiments but only part of embodiments of the disclosure. All other embodiments obtained by those of ordinary skilled in the art on the basis of the embodiments in the disclosure without creative work shall fall within the scope of protection of the disclosure.

It should be understood that the technical solutions in the embodiments of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), an LTE system, an LTE Frequency Division Duplex (FDD) system, an LTE Time Division Duplex (TDD) system and a Universal Mobile Telecommunication System (UMTS).

It should also be understood that, in the embodiments of the disclosure, a base station may also be called as network equipment, network-side equipment or the like. The base station may be a Base Transceiver Station (BTS) in the GSM or CDMA, may also be a NodeB in WCDMA, may further be an Evolutional Node B (eNB or eNodeB) in LTE or base station equipment in a future 5th-Generation (5G) network and the like, which will not be limited in the embodiments of the disclosure.

It should further be understood that, in the embodiments of the disclosure, terminal equipment may communicate with one or more core networks through a Radio Access Network (RAN), and the terminal equipment may be called as an access terminal, User Equipment (UE), a user unit, a user station, a mobile station, a mobile radio station, a remote station, a remote terminal, mobile equipment, a user terminal, a terminal, wireless communication equipment, a user agent or a user device. The terminal equipment may be a cell phone, a cordless phone, a Session Initiation Protocol (SIP) phone, a Wireless Local Loop (WLL) station, a Personal Digital Assistant (PDA), handheld equipment with a wireless communication function, vehicle-mounted equipment, wearable equipment, terminal equipment in the future 5G network and the like.

Figure 1:
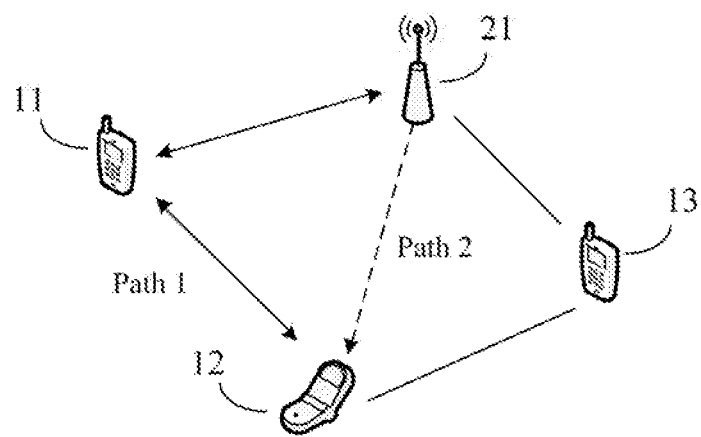
FIG. 1 is a schematic diagram of an application scenario according to an embodiment of the disclosure.

FIG. 1 is a scenario diagram of cellular communication and D2D communication. Terminal equipment 11, terminal equipment 12, terminal equipment 13 and a base station 21 are illustrated in FIG. 1.

In the example, the terminal equipment 12 may perform communication with the base station 21 through a path 2 (i.e., a cellular link). Or, the terminal equipment 12 may also perform communication with the base station 21 through a path 1 (i.e., an SL or a relay link) and through the terminal equipment 11 serving as a relay node. Alternatively, in another example, the terminal equipment 12 may also perform communication with the base station 21 through the terminal equipment 13 serving as the relay node.

Moreover, the terminal equipment 12 may perform path selection according to a quality threshold value of a signal broadcast by the base station 21.

When the terminal equipment 12 is a terminal of a special type, for example, the terminal equipment 12 is wearable equipment incapable of performing communication with the base station, the terminal equipment 12 reuses a D2D technology and terminal relay technology in the related art as much as possible when establishing a connection with a network through the relay node.

However, in an existing D2D technology, a decision about link selection and reselection is made completely on the basis of a terminal, while a network side device may only perform partial control by broadcasting a threshold value of signal quality and allocating resources and may not implement complete control. In addition, for wearable equipment, coverage is not the only requirement for adopting relay links, and part of terminals expect to save power or perform service convergence through the relay links, so signal quality is not the only criterion for determining whether to use a relay link. Therefore, the disclosure is intended to provide better control for selection and reselection of a relay link of a terminal through interaction between a network and a relay terminal.

Figure 2:
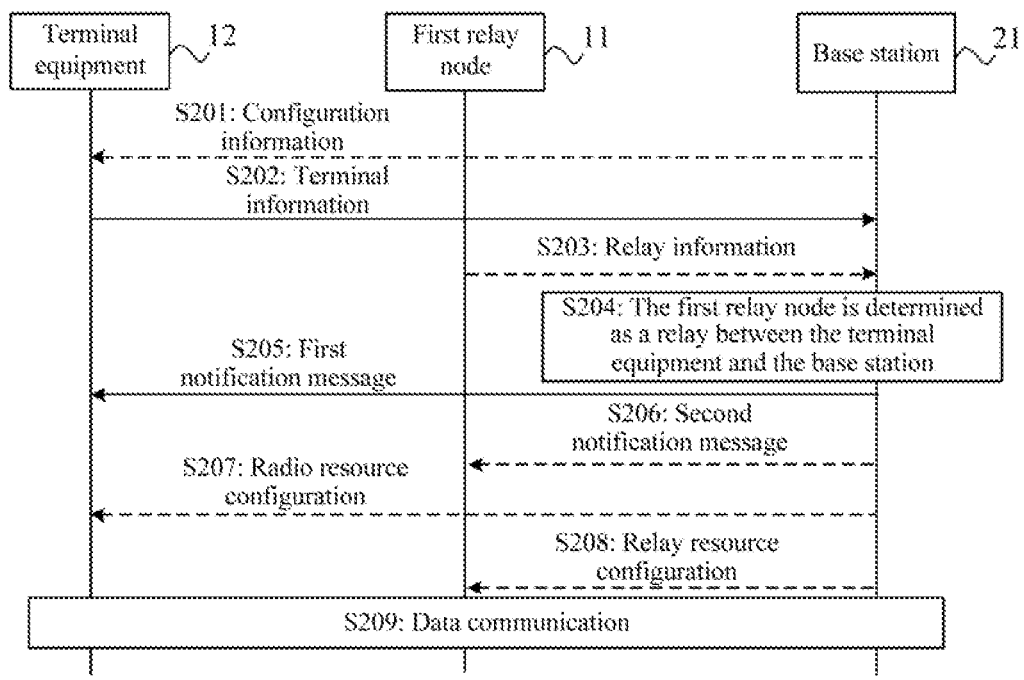
FIG. 2 is a schematic flowchart of a data transmission method according to an embodiment of the disclosure.

FIG. 2 is a flowchart of a data transmission method according to an embodiment of the disclosure. The method illustrated in FIG. 2 includes the following operations.

In S201, a base station 21 sends configuration information to terminal equipment 12.

It can be understood that, before the operation in S201, the terminal equipment 12 performs data transmission with the base station 21 through a cellular link therebetween.

Optionally, the base station 21 may send the configuration information in a broadcast form. In such a manner, all terminal equipment located in coverage of the base station 21 may receive the configuration information. For example, another terminal equipment 11 may also receive the configuration information.

Optionally, in a process that the base station 21 performs communication with the terminal equipment 12 through the cellular link, when it is determined that link switching is required to be performed, the operation in S201 may be executed.

For example, when the base station 21 finds that a distance between the terminal equipment 12 and the base station 21 is increased, or, the base station 21 finds that signal quality between the terminal equipment 12 and the base station 21 gets poor, the operation in S201 may be executed.

The operation in S201 can be understood as an operation that the base station 21 configures the terminal equipment 12 to perform signal quality measurement, and specifically, the base station 21 configures the terminal equipment 12 to perform Uu and/or SL measurement. In the example, Uu refers to an interface between the terminal equipment 12 and the base station 21, and SL refers to an interface between the terminal equipment 12 and other terminal equipment.

In S202, the terminal equipment 12 reports terminal information to the base station 21.

Optionally, after receiving the configuration information, the terminal equipment 12 may perform signal quality measurement. In such a manner, the terminal equipment 12 may determine signal quality information between the terminal equipment 12 and the base station 21.

Optionally, after receiving the configuration information, the terminal equipment 12 mays further initiate a D2D discovery process, thereby determining the signal quality information between the terminal equipment 12 and the other terminal equipment in its vicinity. For example, the terminal equipment 12 may determine signal quality information with the other terminal equipment 11. Herein, the other terminal equipment 11 is called as a first relay node 11.

Correspondingly, the terminal information may include the signal quality information between the terminal equipment 12 and the base station 21, and/or, include the signal quality information between the terminal equipment 12 and the first relay node 11.

In addition, the terminal information may further include a service priority or link tendency of the terminal equipment. For example, the service priority may include a priority 1 of a first service and a priority 2 of a second service. For example, the link tendency may include that the first service tends to use a relay link passing through the first relay node 11, the second service tends to use a relay link passing through another relay node, a third service tends to use a cellular link with the base station and the like.

In the example, the service priority or the link tendency may be preset on the terminal equipment 12 according to a user preference, and namely may be preset by a user according to own preference or service requirement.

It is important to note that, in the embodiment of the disclosure, the operation in S201 is optional. As an example, when the operation in S201 is not executed, the terminal equipment 12 may execute the operation in S202 according to own requirement. For example, in the process that the terminal equipment 12 performs communication with the base station 21 through the cellular link, when link switching is expected to be performed, the operation in S202 may be executed. For example, when the terminal equipment 12 detects that the signal quality between the terminal equipment 12 and the base station 21 is lower than a preset signal threshold value, the operation in S202 is executed to request the cellular link to be switched into an SL. For example, when the terminal equipment 12 detects that a link bandwidth between the terminal equipment 12 and the base station 21 does not meet a specific service (for example, a service A), the operation in S202 is executed to request a transmission link of the service A to be switched from the cellular link to the SL.

In this case, the terminal information includes relay request information. The relay request information indicates that the terminal equipment 12 expects to use the relay node to perform subsequent communication with the base station 21.

It can be understood that, even though the operation in S201 is not executed, the terminal information may further include the abovementioned signal quality information, service priority or link tendency. That is, the terminal equipment 12 may actively initiate signal quality measurement to obtain the abovementioned signal quality information.

It can be understood that, when the configuration information in S201 is sent by the base station 21 in the broadcast form, the base station 21 may receive terminal information of multiple terminal equipment.

In S203, a first relay node 11 sends relay information to the base station 21.

The relay information may include at least one of power information, load information or state information of the first relay node 11, wherein the state information may include a network state and the like of the first relay node 11. For example, the network state may indicate whether data is turned on.

It can be seen that the relay information indicates whether the first relay node 11 may implement access of another terminal (for example, the terminal equipment 12) to the base station 21 as a relay terminal.

It can be understood that the base station 21 may receive relay information sent by multiple terminal equipment.

It is important to note that an execution sequence of the operations in S202 and S203 is not limited in the embodiment of the disclosure. For example, the operation in S202 may be executed at first and then the operation in S203 is executed; or the operation in S203 may be executed at first and then the operation in S202 is executed; or, the operations in S202 and S203 may be executed at the same time.

Optionally, in the embodiment of the disclosure, in S202, the terminal equipment 12 may also send relay information, including at least one of power information, load information or state information of the terminal equipment 12, of the terminal equipment 12 to the base station 21. That is, the terminal equipment 12 may also serve as a relay of another terminal.

Optionally, in the embodiment of the disclosure, in S203, the first relay node 11 may also send terminal information, including signal quality information between the first relay node 11 and the base station 21 and the like, of the first relay node 11 to the base station 21. That is, the terminal equipment 11 may also request another terminal to serve as a relay between the terminal equipment 11 and the base station 21.

In S204, the base station 21 determines that the terminal equipment 12 performs subsequent communication with the base station 21 through the first relay node 11 according to the terminal information received in S202.

The base station 21 may select the first relay node 11 for the terminal equipment 12 as a relay for communication between the terminal equipment 12 and the base station 21 according to the terminal information.

Optionally, the base station 21 may determine the first relay node 11 as the relay for communication between the terminal equipment 12 and the base station 21 according to signal quality between the terminal equipment 12 and the base station 21, signal quality between the terminal equipment 12 and the first relay node 11 and signal quality between the first relay node 11 and the base station 21. For example, when the signal quality between the terminal equipment 12 and the base station 21 gets poor (for example, lower than a certain preset first threshold value) but the signal quality between the terminal equipment 12 and the first relay node 11 and the signal quality between the first relay node 11 and the base station 21 are higher (for example, higher than a certain preset second threshold value), the base station 21 may determine the first relay node 11 as the relay for communication between the terminal equipment 12 and the base station 21.

Optionally, the base station 21 may determine the first relay node 11 as the relay for communication between the terminal equipment 12 and the base station 21 according to the service priority or link tendency of the terminal equipment. For example, assume that the priority of the first service is 1, when the signal quality between the terminal equipment 12 and the base station 21 gets poor but the signal quality between the terminal equipment 12 and the first relay node 11 and the signal quality between the first relay node 11 and the base station 21 are higher, the base station 21 may determine the first relay node 11 as a relay for communication about the first service between the terminal equipment 12 and the base station 21 to ensure transmission of the first service of which the priority is 1. For example, assume that the link tendency includes that the first service tends to use the relay link passing through the first relay node 11 and a service of the terminal equipment 12 to be transmitted is the first service, the base station 21 may determine the first relay node 11 as the relay for communication between the terminal equipment 12 and the base station 21.

Optionally, the base station 21 may determine the first relay node 11 as the relay for communication between the terminal equipment 12 and the base station 21 according to the relay request information. For example, the base station 21 may execute the operation in S204 according to at least one of position information or signal quality information. For example, when the base station 21 determines that the first relay node 11 is in the vicinity of the terminal equipment 12 and the signal quality between the first relay node 11 and the base station 21 is higher than a certain preset threshold value, the first relay node 11 may be determined as the relay for communication between the terminal equipment 12 and the base station 21.

It can be seen that, in the embodiment of the disclosure, the base station may optimize relay link selection according to the user preference and service requirement of the terminal equipment and may select a better transmission link for the terminal equipment.

Optionally, the base station 21 may determine the first relay node 11 as the relay for communication between the terminal equipment 12 and the base station 21 according to the terminal information received in S202 and the relay information received in S203. For example, when the signal quality between the terminal equipment 12 and the first relay node 11 is high (for example, higher than a certain preset second threshold value) and power of the first relay node 11 is high (for example, higher than a certain preset power threshold value), the base station 21 may determine the first relay node 11 as the relay for communication between the terminal equipment 12 and the base station 21.

In S205, the base station 2/ sends a first notification message to the terminal equipment 12, wherein the first notification message is configured to instruct the terminal equipment 12 to perform communication with the base station 21 through the first relay node 11.

In the example, the first notification message may include an identifier of the first relay node 11.

The first notification message may be understood to instruct the terminal equipment 12 to switch a data service from the Uu interface to the SL interface. That is, the terminal equipment 12 is instructed to switch a transmission link of the data service from the cellular link between the terminal equipment 12 and the base station 21 to the SL between the terminal equipment 12 and the first relay node 11.

Optionally, after S204, the method may further include S206.

In S206, the base station 21 sends a second notification message to the first relay node 11, wherein the second notification message is configured to indicate that the terminal equipment 12 will perform communication with the base station 21 through the first relay node 11.

That is, the second notification message is configured to indicate that the first relay node 11 serves as the relay for communication between the terminal equipment 12 and the base station 21, wherein the second notification message may include an identifier of the terminal equipment 12.

Optionally, after S204, the method may further include S207.

In S207, the base station 21 sends radio resource configuration information to the terminal equipment 12 to enable the terminal equipment 12 to perform communication by virtue of radio resources.

Specifically, the base station 21 may send a radio resource configuration to the terminal equipment 12, and then, the terminal equipment 12 uses the radio resources in a process of performing communication with the base station 21 through the first relay node 11.

It can be understood that the radio resources in S207 is D2D transmission resources for communication between the terminal equipment 12 and the first relay node 11.

Optionally, after S204, the method may further include S208.

In S208, the base station 21 sends relay resource configuration information to the first relay node 11 to enable the first relay node 11 to assist the communication between the terminal equipment 12 and the base station 21 by virtue of relay resources.

It is important to note that the operations in S205 and S207 may be executed at the same time, and the first notification message in S205 and the radio resource configuration in S207 may be indicated in the same message. The operations in S206 and S208 may be executed at the same time, and the second notification message in S206 and a relay resource configuration in S208 may be indicated in the same message.

It is important to note that an execution sequence of the operations in S205 and S206 is not limited in the embodiment of the disclosure. For example, the operation in S206 may be executed at first and then the operation in S205 is executed. An execution sequence of the operations in S207 and S208 is not limited in the embodiment of the disclosure. For example, the operation in S208 may be executed at first and then the operation in S207 is executed.

Furthermore, S209 may be executed.

In S209, the terminal equipment 12 performs communication with the base station 21 through the first relay node 11.

That is, the terminal equipment 12 performs communication with the base station 21 through the SL between the terminal equipment 12 and the first relay node 11.

Specifically, the terminal equipment 12 may send UL data to the first relay node 11 through the SL with the first relay node 11, and then the first relay node 11 forwards the UL data to the base station 21.

Optionally, when the operation in S207 is executed, the terminal equipment 12 may perform communication with the first relay node 11 by virtue of the radio resources. That is, the terminal equipment 12 performs data transmission by virtue of the radio resources in the process of performing communication with the base station through the first relay node 11.

Optionally, when the operation in S207 is not executed, the terminal equipment may perform communication with the first relay node 11 by virtue of pre-allocated radio resources. That is, the terminal equipment 12 performs data transmission by virtue of the pre-allocated radio resources in the process of performing communication with the base station through the first relay node 11.

Optionally, when the operation in S208 is executed, the first relay node 11 may assist the communication between the terminal equipment 12 and the base station 21 by virtue of relay resources configured in S218.

It can be seen that, in the embodiment of the disclosure, the base station may determine the relay link according to the terminal information to switch transmission between the terminal equipment and the base station from the cellular link to the SL, thereby further ensuring selection of a better transmission link for the terminal equipment and ensuring transmission efficiency.

Figure 3:
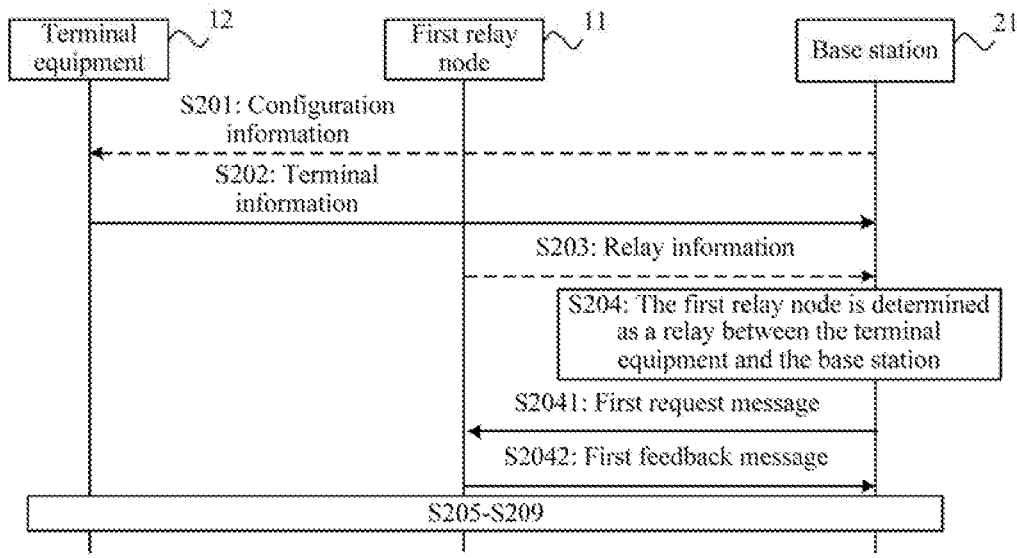
FIG. 3 is another schematic flowchart of a data transmission method according to an embodiment of the disclosure.

Optionally, as another embodiment, as illustrated in FIG. 3, after S204, the method may include the following operations.

In S2041, the base station 21 sends a first request message to the first relay node 11, wherein the first request message is configured to request the first relay node 11 to serve as a relay between the terminal equipment 12 and the base station 21.

Furthermore, the first relay node 11 may determine whether to serve as the relay between the terminal equipment 12 and the base station 21 according to the relay information.

Specifically, the first relay node 11 may make a decision according to a predefined decision criterion. Herein, the predefined decision criterion may include a preset power threshold value and/or a preset load threshold value, etc.

In the example, the predefined decision criterion may be preconfigured on the first relay node 11, or, the predefined decision criterion may be sent by the base station 21 through the configuration information. It can be understood that the configuration information in S201 may include the predefined decision criterion. Or, the configuration information in S201 may include at least one of the preset power threshold value or the preset load threshold value.

That is, after receiving the first request message, the first relay node 11 determines whether the terminal equipment 12 is allowed to perform communication with the base station 21 by virtue of the relay (i.e., the first relay node 11) according to the decision criterion and the relay information.

Specifically, the first relay node 11 may make the determination according to the preset power threshold value and the power of the first relay node 11. When the power of the first relay node 11 is higher than the power threshold value, it may be determined that a determination result is ALLOWED. When the power of the first relay node 11 is lower than the power threshold value, it may be determined that the determination result is REFUSED.

Alternatively, specifically, the first relay node 11 may make the determination according to the preset load threshold value and a load of the first relay node 11. When the load of the first relay node 11 is below the load threshold value, it may be determined that the determination result is ALLOWED. When the load of the first relay node 11 is above the load threshold value, it may be determined that the determination result is REFUSED.

For example, when the power of the first relay node 11 is high (for example, higher than the preset power threshold value) and/or the load of the first relay node 11 is low (for example, lower than the preset load threshold value), it may be determined that the determination result is ALLOWED. That is, the terminal equipment 12 is allowed to perform communication with the base station 21 by virtue of the relay (i.e., the first relay node 11).

In S2042, the first relay node 11 sends a first feedback message to the base station 21, wherein the first feedback message is configured to indicate that the first relay node 11 agrees to serve as the relay.

Or, the first feedback message may also be considered as a relay confirmation message of the first relay node 11.

In such a manner, the base station 21 executes the operation in S205 after receiving the first feedback message of the first relay node 11. That is, the base station 21 executes the operation in S205 after receiving a relay confirmation of the first relay node 11.

It is important to note that, in the embodiment illustrated in FIG. 3, S203 is optional. That is, the base station 21 may determine the first relay node 11 as the relay according to the terminal information in S204.

It can be understood that, referring to the descriptions about FIG. 2, S206 to S208 are optional. That is, the operations in S206 to S208 in the embodiment may not be executed.

Figure 4:
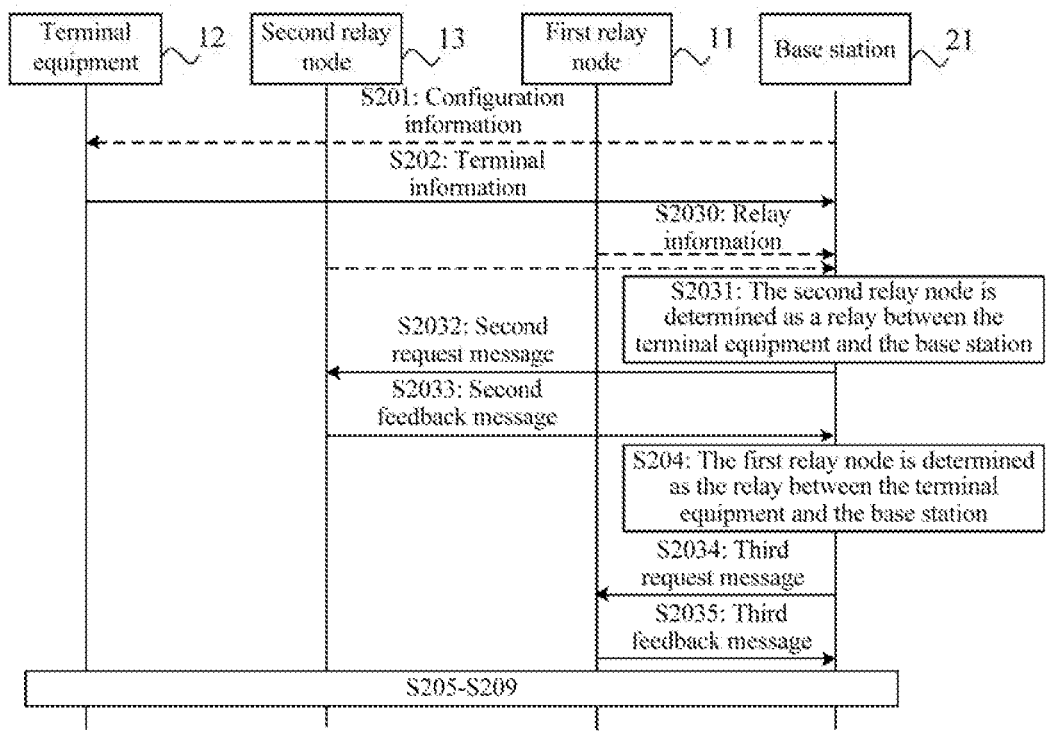
FIG. 4 is another schematic flowchart of a data transmission method according to an embodiment of the disclosure.

Optionally, as another embodiment, as illustrated in FIG. 4, a method includes the following operations.

In S201, a base station 21 sends configuration information.

Specifically, the operation may refer to the descriptions about S201 in the embodiment of FIG. 2, which will not be elaborated herein to avoid repetitions.

In S202, terminal equipment 12 reports terminal information to the base station 21.

Optionally, after receiving the configuration information, the terminal equipment 12 may initiate a D2D discovery process, thereby determining signal quality information between the terminal equipment 12 and other terminal equipment in its vicinity. For example, the terminal equipment 12 may determine signal quality information with other terminal equipment 11, and the terminal equipment 12 may also determine signal quality information with other terminal equipment 13. Herein, the other terminal equipment 11 is called as a first relay node 11 and the other terminal equipment 13 is called as a second relay node 13.

Correspondingly, the terminal information may further include signal quality information between the terminal equipment 12 and the base station 21, and/or, include signal quality information between the terminal equipment 12 and the first relay node 11 and signal quality information between the terminal equipment 12 and the second relay node 13.

Optionally, the terminal information may further include a service priority or a link tendency.

Specifically, the operation may refer to the descriptions about S202 in the embodiment of FIG. 2, which will not be elaborated herein to avoid repetitions.

In S2030, the base station 21 receives relay information sent by a first relay node 11, and the base station 21 receives relay information sent by a second relay node 13.

The relay information sent by the first relay node 11 may include at least one of power information, load information or state information of the first relay node 11.

The relay information sent by the second relay node 13 may include at least one of power information, load information or state information of the second relay node 13.

It is important to note that an execution sequence of the operations in S202 and S2030 is not limited in the embodiment of the disclosure. For example, the operation in S202 may be executed at first and then the operation in S2030 is executed; or the operation in S2030 may be executed at first and then the operation in S202 is executed; or, the operations in S202 and S2030 may be executed at the same time.

It is important to note that S2030 in the embodiment is optional. That is, the operation in S2030 may not be executed.

In S2031, the base station 21 determines the second relay node 13 as a relay for communication between the terminal equipment 12 and the base station 21 according to the terminal information and the relay information.

Optionally, when there are multiple relay nodes capable of serving as the relay of the terminal equipment 12, the base station 21 sequences the multiple relay nodes according to the terminal information and the relay information.

Or, optionally, when the operation in S2030 is not executed, the base station 21 may sequence the multiple relay nodes according to the terminal information. For example, the sequencing is performed according to position information, signal quality information between the multiple relay nodes and the base station 21 or the like.

There is made such a hypothesis that the best choice in the multiple relay nodes is the second relay node 13 and the second best choice is the first relay node 11.

That is, the base station 21 may determine multiple relay paths, the multiple relay paths may be taken as optional paths between the terminal equipment 12 and the base station 21, and moreover, the base station 21 may sequence the multiple relay paths. For example, the relay path passing through the second relay node 13 is the best path and the relay path passing through the first relay node 11 is the second best path.

For example, when power of the second relay node 13 is higher than power of the first relay node 11, and/or, when signal quality between the terminal equipment 12 and the second relay node 13 is higher than signal quality between the terminal equipment 12 and the first relay node 11, the base station 21 may determine the second relay node 13 as the relay.

In S2032, the base station 21 sends a second request message to the second relay node 13, wherein the second request message is configured to request the second relay node 13 to serve as the relay between the terminal equipment 12 and the base station 21.

Further, the second relay node 13 may determine whether to serve as the relay between the terminal equipment 12 and the base station 21 according to the relay information of the second relay node 13.

Specifically, the second relay node 13 may make a determination according to a predefined decision criterion. Herein, the predefined decision criterion may include a preset power threshold value and/or a preset load threshold value, etc.

In the example, the predefined decision criterion may be preconfigured on the second relay node 13, or, the predefined decision criterion may be sent by the base station 21 through the configuration information. It can be understood that the configuration information in S201 may include the predefined decision criterion. Or, the configuration information in S201 may include at least one of the preset power threshold value or the preset load threshold value.

That is, after receiving the second request message, the second relay node 13 determines whether the terminal equipment 12 is allowed to perform communication with the base station 21 by virtue of the relay (i.e., the second relay node 13) according to the relay information of the second relay node 13.

For example, when the power of the second relay node 13 is low (for example, lower than the preset power threshold value), and/or a load of the second relay node 13 is high (for example, higher than the preset load threshold value), it may be determined that a determination result is NOTALLOWED (REFUSED). That is, the terminal equipment 12 is not allowed to perform communication with the base station 21 by virtue of the relay (i.e., the second relay node 13).

In S2033, the second relay node 13 sends a second feedback message to the base station 21, wherein the second feedback message is configured to indicate that the second relay node 13 refuses to serve as the relay.

Since the second relay node 13 does not allow the terminal equipment 12 to execute a relay process through it, the base station 21 is required to select a new relay node. That is, the base station 21 is required to trigger a new relay selection process.

In S204, the base station 21 determines the first relay node 11 as the relay for communication between the terminal equipment 12 and the base station 21 according to the terminal information and the relay information.

The process is similar to S2031, and when the base station 21 determines the best relay path, i.e., the second relay node 13, in S2031, the base station 21 determines the second best relay path, i.e., the first relay node 11, in S204.

In S2034, the base station 21 sends a third request message to the first relay node 11, wherein the third request message is configured to request the first relay node 11 to serve as the relay between the terminal equipment 12 and the base station 21.

Furthermore, the first relay node 11 may determine whether to serve as the relay between the terminal equipment 12 and the base station 21 according to the relay information.

Specifically, the first relay node 11 may make a determination according to the predefined decision criterion. Herein, the predefined decision criterion may include the preset power threshold value and/or the preset load threshold value, etc.

The operation in S2034 is similar to that in S2041 in the embodiment of FIG. 3 and will not be elaborated herein to avoid repetitions.

In S2035, the first relay node 11 sends a third feedback message to the base station 21, wherein the third feedback message is configured to indicate that the first relay node 11 agrees to serve as the relay.

The operation in S2034 is similar to S2042 in the embodiment of FIG. 3 and will not be elaborated herein to avoid repetitions.

Furthermore, after S2035, the base station 21 may execute the operation in S205.

It can be seen that, in the embodiment of the disclosure, the base station may perform coordinated interaction with the relay node to optimize relay link selection in combination with the terminal information and may select a better transmission link for the terminal equipment.

In the embodiment of the disclosure, the base station may determine an optimal relay link for the terminal equipment according to the terminal information or according to the terminal information and the relay information to ensure data transmission of the relay link of the terminal equipment.

Figure 5:
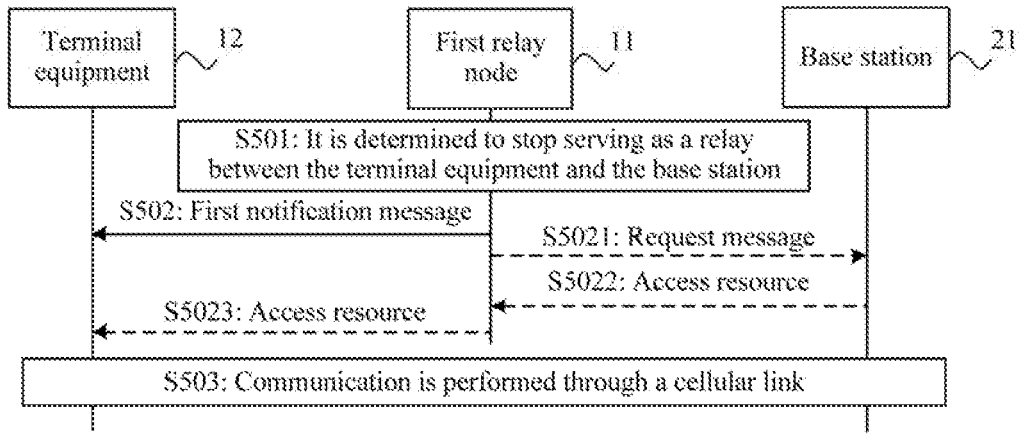
FIG. 5 is another schematic flowchart of a data transmission method according to an embodiment of the disclosure.

FIG. 5 is a flowchart of a data transmission method according to another embodiment of the disclosure. The method illustrated in FIG. 5 includes the following operations.

In S501, a first relay node 11 determines to stop serving as a relay between terminal equipment 12 and a base station 21.

It can be understood that, before S501, the terminal equipment 12 performs communication with the base station 21 through the first relay node 11. That is, before S501, the first relay node 11 is the relay between the terminal equipment 12 and the base station 21.

That is, before S501, the terminal equipment 12 performs communication with the base station 21 through an SL between the terminal equipment 12 and the first relay node 11.

Or, the method illustrated in FIG. 5 may be executed after any embodiment of FIG. 2 to FIG. 4.

The operation in S501 may also be understood as an operation that the first relay node 11 determines to terminate an SL with the terminal equipment 12.

Optionally, before S501, the terminal equipment 12 may perform signal measurement and send measurement information to the first relay node 11. Correspondingly, in S501, the first relay node 11 may determine to stop serving as the relay between the terminal equipment 12 and the base station 21 according to the measurement information. For example, the measurement information may be Reference Signal Received Power (RSRP).

Optionally, the first relay node 11 may determine to stop serving as the relay between the terminal equipment and the base station according to relay information.

Herein, the relay information includes at least one of power information, load information or state information of the first relay node 11.

Optionally, the first relay node 11 may determine to stop serving as the relay according to a preset decision criterion. Herein, the preset decision criterion may include a preset power threshold value and/or a preset load threshold value, etc. in the example, the preset decision criterion may be preconfigured on the first relay node 11, or, the preset decision criterion may be sent to the first relay node 11 by the base station 21 through configuration information.

For example, when power of the first relay node 11 is lower than the preset power threshold value, and/or, when load information of the first relay node 11 is higher than the preset load threshold value, the first relay node 11 may determine not to serve as the relay between the terminal equipment 12 and the base station 21.

Optionally, when being unwilling to continue serving as the relay between the terminal equipment 12 and the base station 21, the first relay node 11 may determine to stop serving as the relay between the terminal equipment and the base station.

In S502, the first relay node 11 sends a first notification message to the terminal equipment 12, wherein the first notification message is configured to instruct the terminal equipment 12 to perform communication with the base station 21 through a first link.

Or, the first notification message is configured to notify the terminal equipment 12 that the SL between the terminal equipment 12 and the first relay node 11 will be released and instruct the terminal equipment 12 to perform communication with the base station 21 through the first link.

Optionally, as an example, the first link in S502 may be a cellular link between the terminal equipment 12 and the base station 21.

Then, after S502, the operation in S503 may be executed.

In S503, the terminal equipment 12 performs communication with the base station 21 through the first link according to the first notification message.

That is, the terminal equipment 12 performs communication with the base station 21 through the cellular link between the terminal equipment 12 and the base station 21 according to the first notification message received in S502.

Optionally, before S503, as illustrated in FIG. 5, the method may further include the following operations.

In S5021, the first relay node 11 sends a request message to the base station 21, wherein the request is configured for enabling the first relay node to replace the terminal equipment 12 to request the base station 21 for an access resource.

The request message may further include indication information that the terminal equipment 12 will perform communication with the base station 21. That is, the first relay node 11 may notify the base station 21 that the terminal equipment 12 expects to perform communication with it.

In S5022, the base station 21 sends the access resource to the first relay node 11.

Specifically, the base station 21 sends the access resource to the first relay node 11 according to the request message.

Optionally, the base station 21 may send an access resource configuration to the first relay node 11, and the first relay node 11 determines the access resource according to the access resource configuration.

In S5023, the first relay node 11 sends the access resource to the terminal equipment 12.

Optionally, the first relay node 11 may send the access resource configuration received from the base station 21 to the terminal equipment 12.

After S5023, the operation in S503 may be executed. Moreover, in S503, the terminal equipment 12 accesses the base station 21 according to the access resource, and after access, performs communication with the base station 21 through the cellular link.

That is, the terminal equipment 12 may execute a random access process at the base station 21 according to the access resource, and after completing random access, perform communication with the base station 21 through the cellular link.

Specifically, the random access mentioned herein may refer to descriptions about a random access process in the related art and will not be elaborated herein to avoid repetitions.

In such a manner, in the embodiment illustrated in FIG. 5, the first relay node determines a transmission link for the terminal equipment, the first relay node requests to the base station for the access resource instead of the terminal equipment, switching of the transmission link of the terminal equipment from the SL to the cellular link may be ensured, and data transmission efficiency may be ensured.

It can be understood that, after the embodiment illustrated in FIG. 5, the method illustrated in any embodiment in FIG. 2 to FIG. 4 may further be executed. That is, switching from the cellular link to the SL is implemented.

Optionally, as another example, the first link in S502 may be an SL between the terminal equipment 12 and a second relay node 13.

Figure 6:
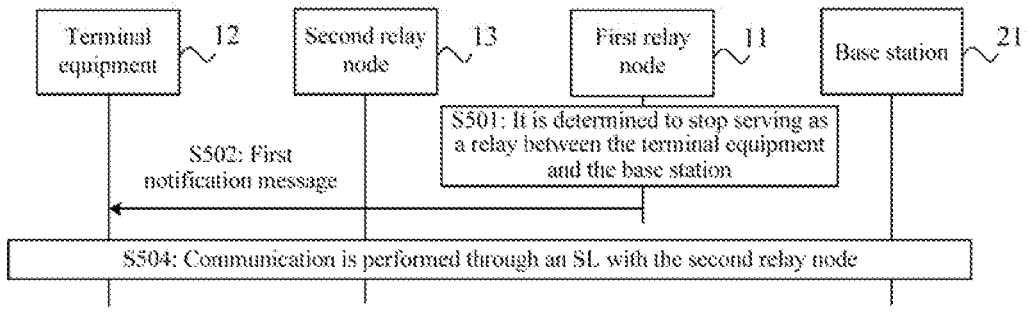
FIG. 6 is another schematic flowchart of a data transmission method according to an embodiment of the disclosure.

Then, after S502, as illustrated in FIG. 6, the operation in S504 may be executed.

In S504, the terminal equipment 12 performs communication with the base station 21 through the SL between the terminal equipment 12 and the second relay node 13.

That is, the second relay node 13 serves as the relay for communication between the terminal equipment 12 and the base station 21.

In such a manner, in the embodiment illustrated in FIG. 6, the first relay node determines the transmission link for the terminal equipment, so that switching of the transmission link of the terminal equipment from an SL (the SL between the terminal equipment 12 and the first relay node 11) to another SL (the SL between the terminal equipment 12 and the second relay node 13) may be ensured, and the data transmission efficiency may be ensured.

Optionally, as another example, the first notification message in S512 is configured to instruct the terminal equipment 12 to select one of multiple links as the first link and perform communication with the base station 21 through the first link. In an example, the multiple links include the SL between the terminal equipment and the second relay node and the cellular link between the terminal equipment and the base station.

It can be understood that, in the embodiment of the disclosure, the first notification message may also instruct the terminal equipment 12 to select one of the multiple links as the first link. The multiple links mentioned herein may include the cellular link and the SL passing through the second relay node, and may also include an SL passing through another relay node and the like.

Figure 7:
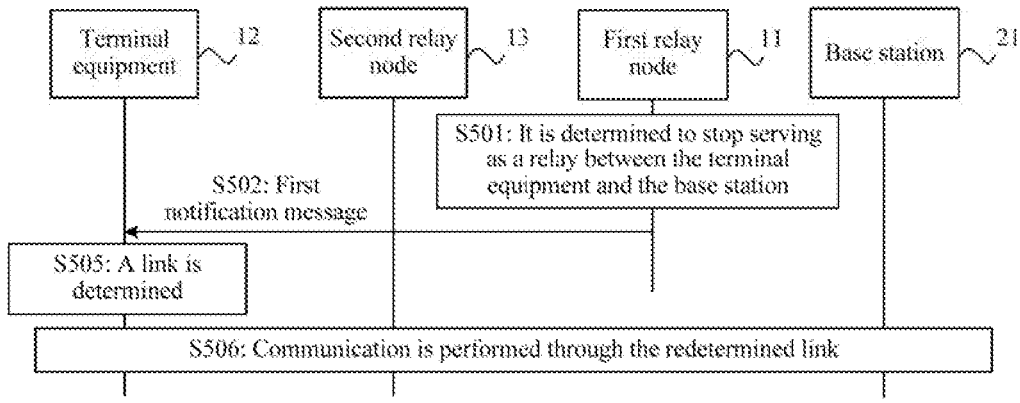
FIG. 7 is another schematic flowchart of a data transmission method according to an embodiment of the disclosure.

Then, after S502, as illustrated in FIG. 7, the operations in S505 and S506 may be executed.

In S505, the terminal equipment 12 determines a transmission link.

Specifically, after receiving the first notification message, the terminal equipment 12 redetermines the transmission link with the base station 21. Herein, the transmission link redetermined by the terminal equipment 12 is the first link.

Optionally, the terminal equipment 12 may select one of the multiple links as the first link.

Optionally, the terminal equipment 12 redetermines the transmission link according to signal strength information.

For example, the terminal equipment 12 may determine to perform communication through the cellular link with the base station 21 according to signal strength between the terminal equipment 12 and the base station 21. For example, when the signal quality between the terminal equipment 12 and the base station 21 is higher than a certain preset signal threshold value, it may be determined that communication is directly performed with the base station 21 through the cellular link with the base station 21. In the example, in S503, the terminal equipment 12 may perform signal detection to determine the signal strength with the base station 21. That is, the terminal equipment 12 may determine that the first link is the cellular link.

For example, the terminal equipment 12 may determine to directly perform communication with the base station 21 through the cellular link with the base station 21 according to the signal strength between the terminal equipment 12 and the base station 21 and signal strength between the terminal equipment 12 and the second relay node 13. For example, if the signal quality between the terminal equipment 12 and the base station 21 is higher than the signal quality between the terminal equipment 12 and the second relay node 13, it may be determined that communication is directly performed with the base station 21 through the cellular link with the base station 21. In the example, in S503, the terminal equipment 12 may execute a D2D discovery process to determine a terminal (for example, the second relay node 13) capable of performing D2D communication with it and further determine the signal strength with the second relay node 13.

For example, the terminal equipment 12 may determine to directly perform communication with the base station 21 through the SL with the second relay node 13 according to the signal strength between the terminal equipment 12 and the second relay node 13. For example, when the signal strength between the terminal equipment 12 and the second relay node 13 is higher than a certain preset signal threshold value, it is determined that communication is directly performed with the base station 21 through the SL with the second relay node 13. That is, the terminal equipment 12 may determine that the SE between the terminal equipment 12 and the second relay node 13 is the first link.

For example, the terminal equipment 12 may determine to directly perform communication with the base station 21 through the SL with the second relay node 13 according to the signal strength between the terminal equipment 12 and the second relay node 13 and relay information of the second relay node 13. Or, the terminal equipment 12 may determine to directly perform communication with the base station 21 through the SL with the second relay node 13 according to the signal strength between the terminal equipment 12 and the base station 21 and the signal strength between the terminal equipment 12 and the second relay node 13 and according to the relay information of the second relay node 13. For example, when the signal strength between the terminal equipment 12 and the second relay node 13 is higher than the signal strength between the terminal equipment 12 and the base station 21, it may be determined that communication is directly performed with the base station 21 through the SL with the second relay node 13.

In the example, the relay information may include at least one of power information, load information or state information of the second relay node 13. The relay information may be sent to the first relay node 11 by the second relay node 13 through an SL between the second relay node 13 and the first relay node 11 and then sent to the terminal equipment 12 by the first relay node 11 through the SL between the first relay node 11 and the terminal equipment 12.

In S506, the terminal equipment performs communication with the base station 21 through the link determined in S505.

Specifically, the terminal equipment 12 performs communication with the base station 21 through the first link.

Optionally, when the link determined by the terminal equipment 12 in S505 is the cellular link, in S506, the terminal equipment 12 performs communication with the base station 21 through the cellular link between the terminal equipment 12 and the base station 21, which may specifically refer to the descriptions about S503 in the embodiment of FIG. 5. It can be understood that, after the embodiment, the method illustrated in any embodiment in FIG. 2 to FIG. 4 may further be executed. That is, switching from the cellular link to the SL is implemented.

Optionally, when the link determined by the terminal equipment 12 in S505 is the SL between the terminal equipment 12 and the second relay node 13, in S506, the terminal equipment 12 performs communication with the base station 21 through the SL between the terminal equipment 12 and the second relay node 13, which may specifically refer to the descriptions about S504 in the embodiment of FIG. 6.

In such a manner, in the embodiment illustrated in FIG. 7, the first relay node instructs the terminal equipment to switch to another link (the first link or a second link), the terminal equipment performs link selection according to a practical condition, switching of the transmission link of the terminal equipment from an SL (the SL between the terminal equipment 12 and the first relay node 11) to a cellular link (the SL between the terminal equipment 12 and the base station 21) or switch from an SL. (the SL between the terminal equipment 12 and the first relay node 11) to another SL (the SL between the terminal equipment 12 and the second relay node 13) may be ensured, and the data transmission efficiency may be ensured.

Thus it can be seen that, in the embodiment of the disclosure, switching of the communication link between the terminal equipment and the base station may be optimized by the base station or by means of coordinated interaction between the base station and the relay node. Specifically, switching from a cellular link to an SL (i.e. a relay link), or switching from an SL to a cellular link or switching from an SL to another SL may be implemented according to the practical condition, and a better transmission link may be selected for the terminal equipment, so that communication quality between the terminal equipment and the base station may be ensured.

Figure 8:
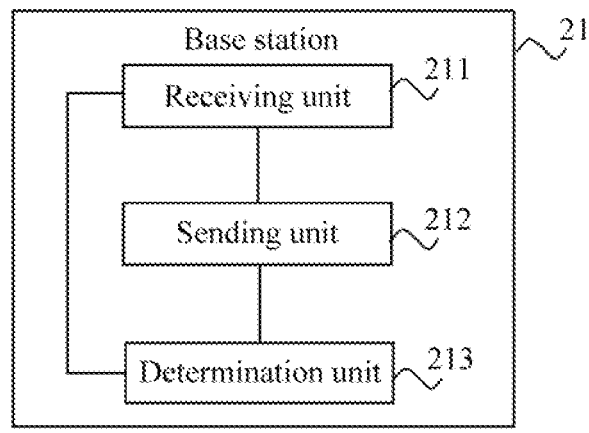
FIG. 8 is a structure block diagram of a base station according to an embodiment of the disclosure.

FIG. 8 is a structure block diagram of a base station according to an embodiment of the disclosure. The base station 21 illustrated in FIG. 8 includes a receiving unit 211, a sending unit 212 and a determination unit 213.

The receiving unit 211 is configured to receive terminal information sent by terminal equipment.

The determination unit 212 is configured to determine that the terminal equipment performs communication with the base station through a first relay node according to the terminal information received by the receiving unit 211.

The sending unit 213 is configured to send a first notification message to the terminal equipment, wherein the first notification message is configured to instruct the terminal equipment to perform communication with the base station through the first relay node.

In the embodiment of the disclosure, the base station may instruct the terminal equipment to switch a cellular link to an SL passing through the first relay node, thereby ensuring communication quality between the terminal equipment and the base station.

Optionally, as an example, the receiving unit 211 may further be configured to receive relay information sent by the first relay node; and the determination unit 212 may be specifically configured to determine that the terminal equipment performs communication with the base station through the first relay node according to the terminal information and the relay information. In the example, the relay information includes at least one of power information, load information or state information of the first relay node.

Optionally, as another example, the sending unit 213 may further be configured to send a first request message to the first relay node, wherein the first request message is configured to request the first relay node to serve as a relay between the terminal equipment and the base station. The receiving unit 211 may further be configured to receive a first feedback message from the first relay node, wherein the first feedback message is configured to indicate that the first relay node agrees to serve as the relay.

In the example, the sending unit 212 may further be configured to: send a decision criterion to the first relay node to enable the first relay node to determine whether to serve as the relay according to the decision criterion. Herein, the decision criterion includes at least one of a preset power threshold value or a preset load threshold value.

Optionally, as another example, the sending unit 212 may further be configured to send a second request message to a second relay node, wherein the second request message is configured to request the second relay node to serve as the relay between the terminal equipment and the base station. The receiving unit 211 may further be configured to receive a second feedback message from the second relay node, wherein the second feedback message is configured to indicate that the second relay node refuses to serve as the relay. The sending unit 212 may further be configured to send a third request message to the first relay node, wherein the third request message is configured to request the first relay node to serve as the relay between the terminal equipment and the base station. The receiving unit 211 may further be configured to receive a third feedback message from the first relay node, wherein the third feedback message is configured to indicate that the first relay node agrees to serve as the relay.

Further, the sending unit 212 may further be configured to: send a second notification message to the first relay node, wherein the second notification message is configured to indicate that the terminal equipment will perform communication with the base station through the first relay node.

Furthermore, the sending unit 212 may further be configured to: send relay resource configuration information to the first relay node to enable the first relay node to assist the communication between the terminal equipment and the base station by virtue of relay resources.

Furthermore, the sending unit 212 may further be configured to: send radio resource configuration information to the terminal equipment to enable the terminal equipment to perform communication by virtue of radio resources.

Herein, the terminal information in the embodiment of the disclosure includes at least one of: relay request information; signal quality information between the terminal equipment and the first relay node signal quality information between the terminal equipment and the base station; or, a service priority or link tendency of the terminal equipment.

Optionally, the sending unit 212 may further be configured to: send configuration information to the terminal equipment, wherein the configuration information is configured to instruct the terminal equipment to perform signal quality measurement.

Figure 9:
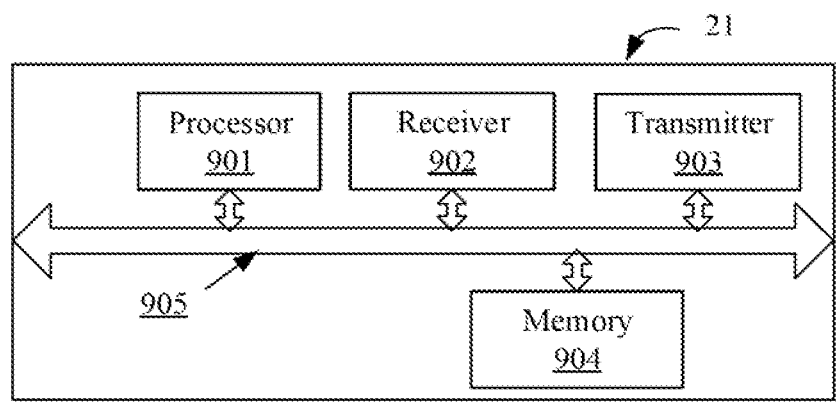
FIG. 9 is a structure block diagram of a base station according to another embodiment of the disclosure.

It is important to note that, in the embodiment of the disclosure, the receiving unit 211 may be implemented by a receiver, the sending unit 212 may be implemented by a transmitter and the determination unit 213 may be implemented by a processor. As illustrated in FIG. 9, a base station 21 may include a processor 901, a receiver 902, a transmitter 903 and a memory 904. The memory 904 may be configured to store a code executed by the processor 901 and the like, and the processor 901 is configured to execute the code stored in the memory 904.

Components in the base station 21 are coupled together through a bus system 905, wherein the bus system 905 includes a data bus, and further includes a power bus, a control bus and a state signal bus.

Figure 10:
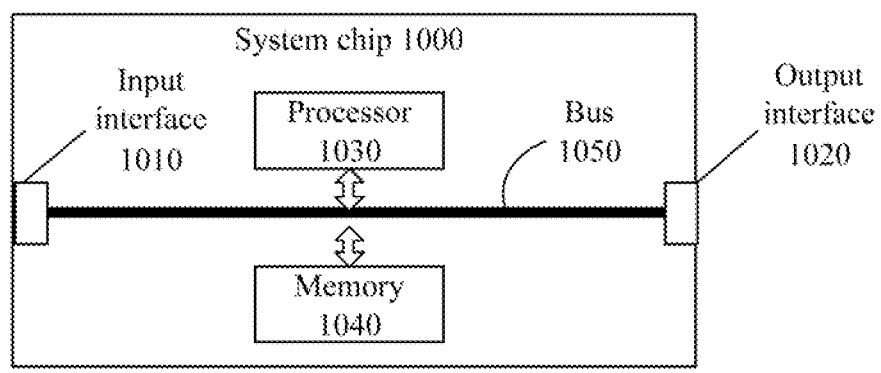
FIG. 10 is a schematic structure diagram of a system chip according to an embodiment of the disclosure.

FIG. 10 is a schematic structure diagram of a system chip according to an embodiment of the disclosure. The system chip 1000 in FIG. 10 includes an input interface 1010, an output interface 1020, at least one processor 1030 and a memory 1040. The input interface 1010, the output interface 1020, the processor 1030 and the memory 1040 are connected through a bus 1050. The processor 1030 is configured to execute a code in the memory 1040, and when the code is executed, the processor 1030 implements a method executed by, a base station in any embodiment of FIG. 2 to FIG. 4.

The base station 21 illustrated in FIG. 8 or the base station 21 illustrated in FIG. 9 or the system chip 1000 illustrated in FIG. 10 may implement each process implemented by the base station in any method embodiment of FIG. 2 to FIG. 4, which will not be elaborated to avoid repetitions.

Figure 11:
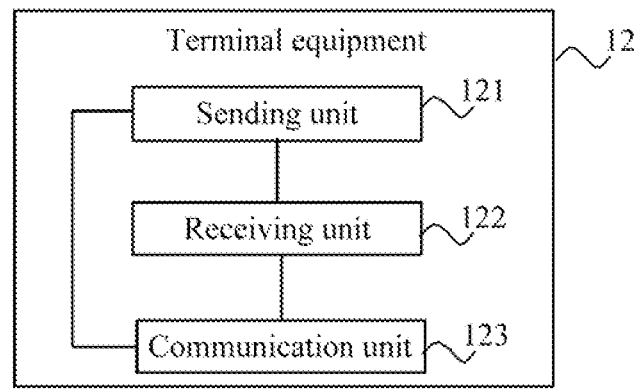
FIG. 11 is a structure block diagram of terminal equipment according to an embodiment of the disclosure.

FIG. 11 is a structure block diagram of terminal equipment according to an embodiment of the disclosure. The terminal equipment 12 illustrated in FIG. 11 includes: a sending unit 121, a receiving unit 122 and a communication unit 123.

Optionally, as an example:

the sending unit 121 is configured to send terminal information to a base station; and the receiving unit 122 is configured to receive a first notification message sent by the base station, wherein the first notification message is configured to instruct the terminal equipment to perform communication with the base station through a first relay node, and the first notification message is determined by the base station according to the terminal information.

In the embodiment of the disclosure, the terminal equipment receives a notification of the base station and accordingly switches a cellular link to an SL passing through the first relay node, so that communication quality between the terminal equipment and the base station may be ensured.

Optionally, as an example, the receiving unit 122 may further be configured to receive radio resource configuration information sent by the base station. The communication unit 123 is configured to perform communication with the base station by virtue of radio resources through the first relay node.

Optionally, as another example, the communication unit 123 may be configured to perform communication with the base station by virtue of pre-allocated radio resources through the first relay node.

In addition, the terminal equipment 12 illustrated in FIG. 11 may further include a measurement unit. Specifically, the receiving unit 122 may further be configured to receive configuration information sent by the base station. Correspondingly, the measurement unit is configured to perform signal quality measurement according to the configuration information.

Figure 12:
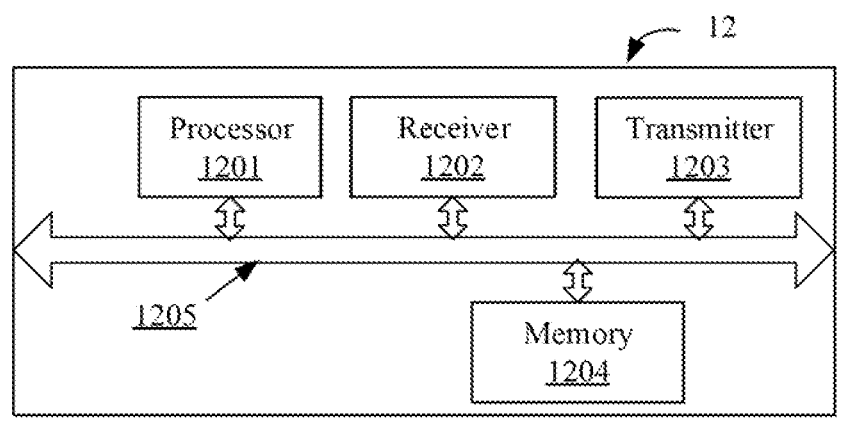
FIG. 12 is a structure block diagram of terminal equipment according to another embodiment of the disclosure.

It is important to note that, in the embodiment of the disclosure, the sending unit 121 may be implemented by a transmitter, the receiving unit 122 may be implemented by a receiver and the communication unit 123 may be implemented by a processor. As illustrated in FIG. 12, terminal equipment 12 may include a processor 1201, a receiver 1202, a transmitter 1203 and a memory 1204. The memory 1204 may be configured to store a code executed by the processor 1201 and the like, and the processor 1201 may be configured to execute the code stored in the memory 1204.

Components in the terminal equipment 12 are coupled together through a bus system 1205, wherein the bus system 1205 includes a data bus, and further includes a power bus, a control bus and a state signal bus.

Figure 13:
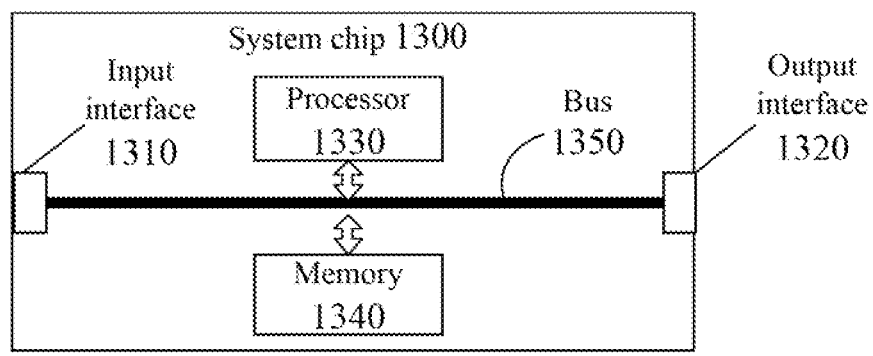
FIG. 13 is a schematic structure diagram of a system chip according to another embodiment of the disclosure.

FIG. 13 is another schematic structure diagram of a system chip according to an embodiment of the disclosure. The system chip 1300 in FIG. 13 includes an input interface 1310, an output interface 1320, at least one processor 1330 and a memory 1340. The input interface 1310, the output interface 1320, the processor 1330 and the memory 1340 are connected through a bus 1350. The processor 1330 is configured to execute a code in the memory 1340, and when the code is executed, the processor 1330 implements a method executed by a base station in any embodiment of FIG. 2 to FIG. 4.

The terminal equipment 12 illustrated in FIG. 11 or the terminal equipment 12 illustrated in FIG. 12 or the system chip 1300 illustrated in FIG. 13 may implement each process implemented by the terminal equipment in any method embodiment of FIG. 2 to FIG. 4, which will not be elaborated to avoid repetitions.

Optionally, as an embodiment:

the receiving unit 122 is configured to receive a first notification message sent by the first relay node, wherein the first notification message is configured to instruct the terminal equipment to perform communication with the base station through the first link; and the communication unit 123 is configured to per communication with the base station through the first link according to the first notification message received by the receiving unit 122.

In the embodiment, the terminal equipment may switch the SL passing through the first relay node to the first link according to a notification of the first relay node, thereby ensuring communication quality between the terminal equipment and the base station.

Optionally, as an example, the communication unit 123 may further be configured to perform communication with the base station through the first relay node.

As an example, the first link is a cellular link between the terminal equipment and the base station, and the first notification message is configured to instruct the terminal equipment to perform communication with the base station through the cellular link.

Furthermore, the receiving unit 122 may further be configured to receive an access resource sent by the first relay node, wherein the access resource is requested to the base station by the first relay node. The communication unit 123 may specifically be configured to access the base station according to the access resource, and after access, perform communication with the base station through the cellular link.

As another example, the first link is an SL between the terminal equipment and a second relay node, and the first notification message is configured to instruct the terminal equipment to perform communication with the base station through the SL.

As another example, the first notification message is configured to instruct the terminal equipment to select one of multiple links as the first link and perform communication with the base station through the first link. The multiple links include the SL between the terminal equipment and the second relay node and the cellular link between the terminal equipment and the base station.

The communication unit 123 may specifically be configured to: determine that the first link is the cellular link between the terminal equipment and the base station according to signal strength between the terminal equipment and the base station, and perform communication with the base station through the first link.

The communication unit 123 may specifically be configured to: determine that the first link is the SL between the terminal equipment and the second relay node according to signal strength between the terminal equipment and the second relay node and perform communication with the base station through the first link. Or, the communication unit 123 may specifically be configured to: determine that the first link is the SL between the terminal equipment and the second relay node according to the signal strength between the terminal equipment and the second relay node and relay information of the second relay node, and perform communication with the base station through the first link.

Herein, the relay information includes at least one of power information, load information or state information of the second relay node.

Correspondingly, in the embodiment, the processor 1330 in FIG. 13 implements a method executed by the base station in any embodiment in FIG. 5 to FIG. 7.

The terminal equipment 12 illustrated in FIG. 1 or the terminal equipment 12 illustrated in FIG. 12 or the system chip 1300 illustrated in FIG. 13 may implement each process implemented by the terminal equipment in any method embodiment of FIG. 5 to FIG. 7, which will not be elaborated to avoid repetitions.

Figure 14:
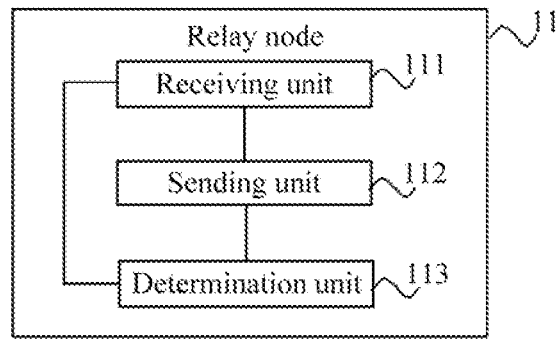
FIG. 14 is a structure block diagram of a relay node according to an embodiment of the disclosure.

FIG. 14 is a structure block diagram of a relay node according to an embodiment of the disclosure. It can be understood that the relay node is a terminal for realizing a relay function. The relay node in FIG. 14 may be a first relay node 11, including a receiving unit 111 and a sending unit 112. Furthermore, the first relay node 11 may further include a determination unit 113.

The receiving unit 111 is configured to receive a first request message sent by a base station, wherein the first request message is configured to request the first relay node to serve as a relay between terminal equipment and the base station.

The sending unit 112 is configured to, when the first relay node agrees to serve as the relay, send a first feedback message to the base station, wherein the first feedback message is configured to indicate that the first relay node agrees to serve as the relay, or the sending unit 112 is configured to, when the first relay node refuses to serve as the relay, send a second feedback message to the base station, wherein the second feedback message is configured to indicate that the first relay node refuses to serve as the relay.

In the embodiment of the disclosure, the base station performs coordinated interaction with the first relay node and the first relay node may assist the base station to switch a cellular link of the terminal equipment to an SL passing through the first relay node. Or, the first relay node may refuse the request and the base station switches the cellular link of the terminal equipment to another SL not passing through the first relay node. Therefore, communication quality between the terminal equipment and the base station may be ensured.

The determination unit 113 may be configured to determine whether to agree to serve as the relay according to a decision criterion.

Correspondingly, the receiving unit 111 may further be configured to receive configuration information sent by the base station, wherein the configuration information comprises the decision criterion, and the decision criterion includes at least one of a preset power threshold value or a preset load threshold value.

Optionally, the determination unit 113 may specifically be configured to determine whether to agree to serve as the relay according to the decision criterion and relay information of the first relay node, wherein the relay information includes at least one of power information, load information or state information of the first relay node.

Furthermore, when the sending unit 112 sends the first feedback message to the base station, the receiving unit 111 may further be configured to receive a second notification message sent by the base station, wherein the second notification message is configured to indicate that the terminal equipment will perform communication with the base station through the first relay node.

Furthermore, when the sending unit 112 sends the first feedback message to the base station, the receiving unit 111 may further be configured to receive relay resource configuration information sent by the base station. The first relay node 11 may further include a communication unit, configured to assist the communication between the terminal equipment and the base station by virtue of relay resources.

Figure 15:
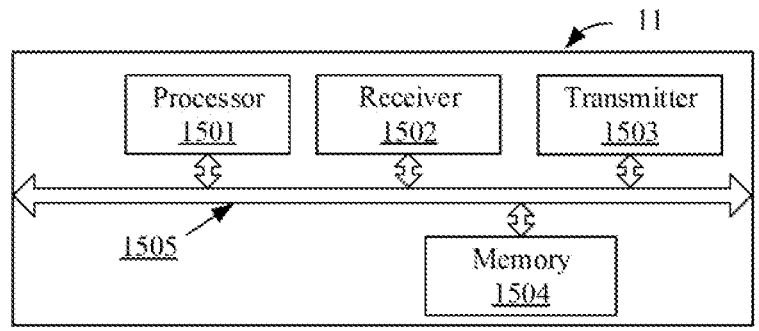
FIG. 15 is a structure block diagram of a relay node according to another embodiment of the disclosure.

It is important to note that, in the embodiment of the disclosure, the receiving unit 111 may be implemented by a receiver, the sending unit 112 may be implemented by a transmitter and the communication unit 113 may be implemented by a processor. As illustrated in FIG. 15, a relay node 11 may include a processor 1501, a receiver 1502, a transmitter 1503 and a memory 1504. The memory 1504 may be configured to store a code executed by the processor 1501 and the like, and the processor 1501 is configured to execute the code stored in the memory 1504.

Components in the relay node 11 are coupled together through a bus system 1505, wherein the bus system 1505 includes a data bus, and further includes a power bus, a control bus and a state signal bus.

Figure 16:
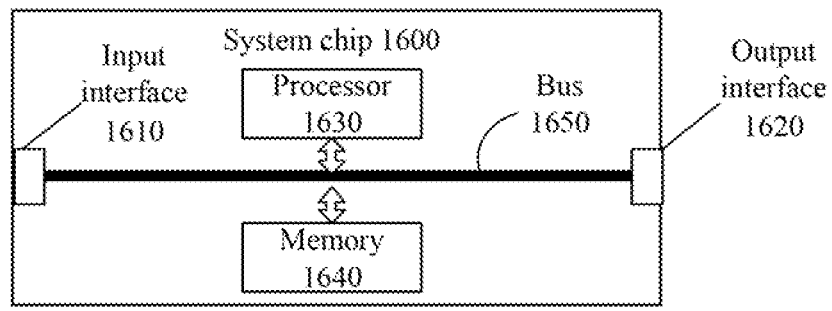
FIG. 16 is a schematic structure diagram of a system chip according to another embodiment of the disclosure.

FIG. 16 is another schematic structure diagram of a system chip according to an embodiment of the disclosure. The system chip 1600 in FIG. 16 includes an input interface 1610, an output interface 1620, at least one processor 1630 and a memory 1640. The input interface 1610, the output interface 1620, the processor 1630 and the memory 1640 are connected through a bus 1650. The processor 1630 is configured to execute a code in the memory 1640, and when the code is executed, the processor 1630 implements a method executed by a first relay node in any embodiment of FIG. 2 to FIG. 4.

The first relay node 11 illustrated in FIG. 14 or the first relay node 11 illustrated in FIG. 15 or the system chip 1600 illustrated in FIG. 16 may implement each process implemented by the first relay node in any method embodiment of FIG. 2 to FIG. 4, which will not be elaborated to avoid repetitions.

Figure 17:
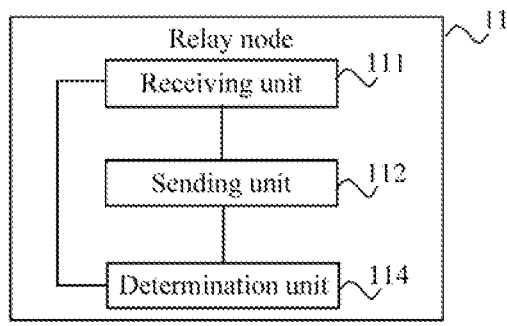
FIG. 17 is a structure block diagram of a relay node according to another embodiment of the disclosure.

FIG. 17 is a structure block diagram of a relay node according to another embodiment of the disclosure. The relay node illustrated in FIG. 17 may be a first relay node 11, and includes: a receiving unit 111, a sending unit 112 and a determination unit 114.

The determination unit 114 is configured to determine to stop serving as a relay between terminal equipment and a base station.

The sending unit 112 is configured to send a first notification message to the terminal equipment, wherein the first notification message is configured to instruct the terminal equipment to perform communication with the base station through a first link.

In the embodiment of the disclosure, the relay node may determine path switching between the terminal equipment and the base station and switch an SL passing through the relay node to the first link. In such a manner, communication quality between the terminal equipment and the base station may be ensured.

Optionally, the determination unit 114 may specifically be configured to: determine to stop serving as the relay between the terminal equipment and the base station according to relay information, wherein the relay information includes at least one of power information, load information or state information of the first relay node.

As an example, the first link is a cellular link between the terminal equipment and the base station. Correspondingly, the sending unit 112 may further be configured to send a request message to the base station, wherein the request message is configured for enabling the relay node to replace the terminal equipment to request the base station for an access resource. The receiving unit 111 may be configured to receive the access resource sent by the base station. The sending unit 112 may further be configured to send the access resource to the terminal equipment to enable the terminal equipment to access the base station according to the access resource.

As another example, the first link is an SL between the terminal equipment and a second relay node.

As another example, the first notification message is configured to instruct the terminal equipment to select one of multiple links as the first link and perform communication with the base station through the first link. Herein, the multiple links include the SL between the terminal equipment and the second relay node and the cellular link between the terminal equipment and the base station.

It is important to note that in the embodiment of the disclosure, as illustrated in FIG. 15, the receiving unit 111 may be implemented by a receiver, the sending unit 112 may be implemented by a transmitter and the determination unit 114 may be implemented by a processor.

Correspondingly, the processor 1630 implements a method executed by the first relay node in any embodiment of FIG. 5 to FIG. 7.

The first relay node 11 illustrated in FIG. 17 or the first relay node 11 illustrated in FIG. 15 or the system chip 1600 illustrated in FIG. 16 may implement each process implemented by the first relay node in any method embodiment of FIG. 5 to FIG. 7, which will not be elaborated to avoid repetitions.

It can be understood that the processor in the embodiment of the disclosure may be an integrated circuit chip with a signal processing capability. In an implementation process, each operation of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the disclosure may be implemented or executed. The universal processor may be a microprocessor or the processor may also be any conventional processor and the like. The steps of the methods disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory and completes the steps of the methods in combination with hardware.

It can be understood that the memory in the embodiment of the disclosure may be a volatile memory or a nonvolatile memory, or may include both the volatile and nonvolatile memories, wherein the nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAM s in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is important to note that the memory of a system and method described in the disclosure is intended to include, but not limited to, memories of these and any other proper types.

Those of ordinary skilled in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions fir each specific application by virtue of different methods, but such realization shall fall within the scope of the disclosure.

Those skilled in the art may dearly learn about that specific working processes of the system, device and unit described above may refer to the corresponding processes in the method embodiments and will not be elaborated herein for convenient and brief description.

In some embodiments provided by the application, it should be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and pans displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit.

When being realized in form of software function unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a piece of computer equipment (which may be a personal computer, a server, network equipment or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A base station, comprising:
a transmitter, configured to send a decision criterion to a first relay node to enable the first relay node to determine whether to serve as a relay according to the decision criterion;
a receiver, configured to receive terminal information sent by terminal equipment, wherein the terminal information comprises a link that the terminal equipment tends to use, and the link comprises a relay link passing through a first relay node;
a processor, configured to determine, according to the terminal information, that the terminal equipment performs communication with the base station through the first relay node, the operating of determining comprising:
sending, through the transmitter, a first request message to the first relay node, wherein the first request message is configured to request the first relay node to serve as a relay between the terminal equipment and the base station; and
receiving, through the receiver, a first feedback message from the first relay node, wherein the first feedback message is configured to indicate that the first relay node agrees to serve as the relay; and wherein the transmitter is further configured to send a first notification message to the terminal equipment, wherein the first notification message is configured to instruct the terminal equipment to perform communication with the base station through the first relay node.

2. The base station according to claim 1, wherein the receiver is configured to:

before the processor determines, according to the terminal information, that the terminal equipment performs communication with the base station through the first relay node, receive relay information sent by the first relay node;

wherein the processor is configured to:

determine, according to the terminal information and the relay information, that the terminal equipment performs communication with the base station through the first relay node.

3. The base station according to claim 2, wherein the relay information comprises at least one of power information, load information or state information of the first relay node.

4. The base station according to claim 1, wherein the decision criterion comprises at least one of a preset power threshold value or a preset load threshold value.

5. The base station according to claim 1, wherein the transmitter is configured to send a second request message to a second relay node, wherein the second request message is configured to request the second relay node to serve as a relay between the terminal equipment and the base station;

the receiver is configured to receive a second feedback message from the second relay node, wherein the second feedback message is configured to indicate that the second relay node refuses to serve as the relay;

the transmitter is configured to send a third request message to the first relay node, wherein the third request message is configured to request the first relay node to serve as the relay between the terminal equipment and the base station; and the receiver is configured to receive a third feedback message from the first relay node, wherein the third feedback message is configured to indicate that the first relay node agrees to serve as the relay.

6. The base station according to claim 1, wherein:

the transmitter is configured to send a second notification message to the first relay node, wherein the second notification message is configured to indicate that the terminal equipment will perform communication with the base station through the first relay node.

7. The base station according to claim 1, wherein the transmitter is configured to perform at least one of:

sending relay resource configuration information to the first relay node to enable the first relay node to assist the communication between the terminal equipment and the base station by virtue of relay resources, or sending radio resource configuration information to the terminal equipment to enable the terminal equipment to perform the communication by virtue of radio resources.

8. The base station according to claim 1, wherein the terminal information further comprises at least one of:

relay request information;

signal quality information between the terminal equipment and the first relay node;

signal quality information between the terminal equipment and the base station; or a service priority.

9. A terminal equipment, comprising:

a transmitter, configured to send terminal information to a base station, wherein the terminal information comprises a link that the terminal equipment tends to use, and the link comprises a relay link passing through a first relay node; and a receiver, configured to receive a first notification message sent by the base station, wherein the first notification message is configured to instruct the terminal equipment to perform communication with the base station through the first relay node, and the first notification message is determined by the base station according to the terminal information, the base station being configured to send, before performing the operation of determining, a decision criterion to the first relay node to enable the first relay node to determine whether to serve as a relay according to the decision criterion, wherein the operation of the determining comprises:

sending, to the first relay node, a first request message configured to request the first relay node to serve as a relay between the terminal equipment and the base station; and receiving, from the first relay node, a first feedback message configured to indicate that the first relay node agrees to serve as the relay.

10. The terminal equipment according to claim 9, wherein:

the receiver is configured to receive radio resource configuration information sent by the base station; and the processor is configured to perform communication with the base station by virtue of radio resources through the first relay node.

11. The terminal equipment according to claim 9, wherein before the transmitter sends the terminal information to the base station, the receiver is configured to receive configuration information sent by the base station; and the processor is configured to perform signal quality measurement according to the configuration information.

12. A terminal equipment, comprising:

a receiver, configured to receive a first notification message sent by a first relay node, wherein the first notification message is configured to instruct the terminal equipment to autonomously select one of multiple links as a first link and perform communication with a base station through the first link, wherein the multiple links comprise a sidelink (SL) between the terminal equipment and a second relay node different from the first relay node and a cellular link between the terminal equipment and the base station, and the first link is the SL; and a processor, configured to autonomously select the first link according to the first notification message, and perform communication with the base station through the first link.

13. The terminal equipment according to claim 12, wherein the processor is configured to:

determine that the first link is the SL between the terminal equipment and the second relay node according to signal strength between the terminal equipment and the second relay node, and perform communication with the base station through the first link.

14. The terminal equipment according to claim 13, wherein the processor is configured to determine that the first link is the SL between the terminal equipment and the second relay node according to the signal strength between the terminal equipment and the second relay node and relay information of the second relay node, and perform communication with the base station through the first link.

15. The terminal equipment according to claim 14, wherein the relay information comprises at least one of power information, load information or state information of the second relay node.

* * * * *